United States Patent [19]

Yoshida

[11] Patent Number: 5,323,199
[45] Date of Patent: Jun. 21, 1994

[54] ZOOM CAMERA AND METHOD OF OPERATING THE SAME

[75] Inventor: Yutaka Yoshida, Tokyo, Japan

[73] Assignee: Fuji Photo Film Co., Ltd., Kanagawa, Japan

[21] Appl. No.: 6,133

[22] Filed: Jan. 19, 1993

[30] Foreign Application Priority Data

Jan. 17, 1992 [JP] Japan .................................. 4-6834

[51] Int. Cl.$^5$ .............................................. G03B 1/18
[52] U.S. Cl. ................................ 354/195.1; 354/195.12
[58] Field of Search ......................... 354/195.1, 195.12; 324/723, 704, 705, 713; 340/870.37, 870.38; 359/694, 695, 696, 699, 700, 823, 825, 826, 829

[56] References Cited

U.S. PATENT DOCUMENTS

| | | | |
|---|---|---|---|
| 4,411,507 | 10/1983 | Kondo | 354/195.1 |
| 4,508,443 | 3/1985 | Matsuzaki et al. | 354/402 |
| 4,994,752 | 2/1991 | Hata | 324/714 |
| 5,023,645 | 6/1991 | Yoshida | 354/400 |
| 5,198,932 | 3/1993 | Takamura | 354/195.12 |
| 5,202,717 | 4/1993 | Ookubo et al. | 354/400 |
| 5,208,623 | 5/1993 | Takahashi | 354/195.1 |

*Primary Examiner*—Russell E. Adams
*Assistant Examiner*—Eddie C. Lee
*Attorney, Agent, or Firm*—Young & Thompson

[57] ABSTRACT

A zoom camera incorporates a zoom assembly in which a zoom lens system is supported. The zoom assembly has a stationary barrel and an intermediate movable barrel. A stationary, elongated resistor element extends along the direction of movement of the zoom assembly. Nine electrodes are connected to one side of the resistor elements regularly, and grounded. Eight electrodes are connected to the opposite side of the resistor elements, and regularly alternate with the former nine electrodes. To the latter eight electrodes is applied a potential different from zero. The resistor element is divided into 16 resistor areas by the 17 electrodes. A contact brush slides on the resistor element when the movable barrel moves, and generates a voltage signal representing the contact position within each resistor area. The voltage signal is digitalized as a voltage data represented in 64 steps. A counter counts the number of times the gradient of the voltage signal changes between increase and decrease while the movable barrel moves, to designate one resistor area where the brush is located. The position of the movable barrel is identified in 1024 steps, according to the voltage data and a count signal. In a preferred embodiment, the brush is inhibited from stopping in the vicinity of positions where the electrodes are connected.

30 Claims, 21 Drawing Sheets

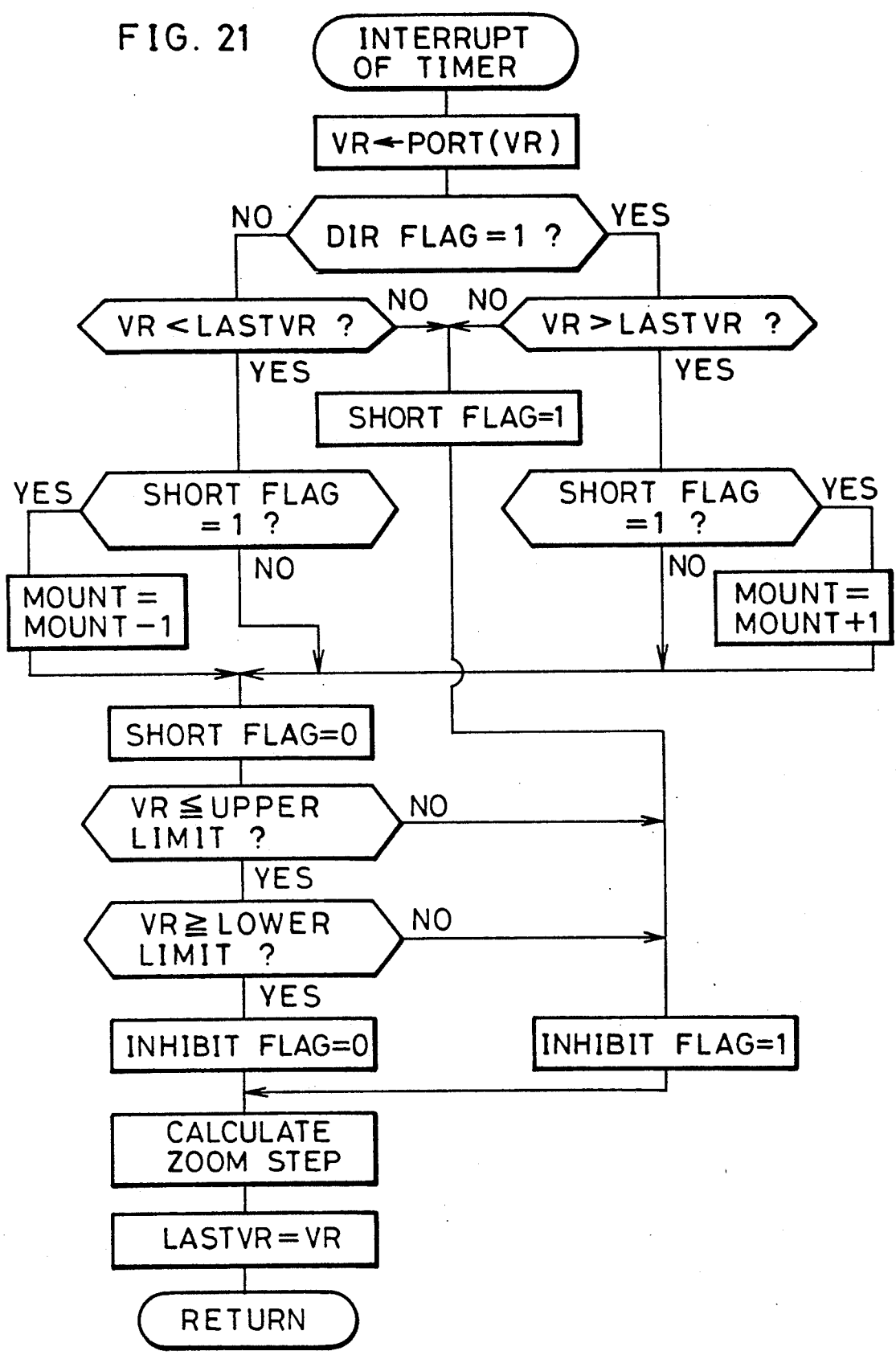

though 256 steps is
ZOOM CAMERA AND METHOD OF OPERATING THE SAME

BACKGROUND OF THE INVENTION

1. Field of the Invention

The present invention relates to a zoom camera and a method of operating the same. More particularly, the present invention relates to such a zoom camera and method that the amount of zooming can be detected with high precision.

2. Description of the Prior Art

Compact cameras commercially available at present often have a zoom lens built therein. The zoom lens is generally provided with a front lens group and a rear lens group, both contained in a movable lens barrel. To zoom such a camera, the movable barrel is shifted to move the front and rear lens groups together. When the zoom lens is focussed on a subject to be photographed, one of the lens groups is moved within the movable barrel. In a zoom lens of rear-focussing type, the front lens group is the variator, and the rear lens group is the compensator having a focussing effect.

Such a compact camera also incorporates a microcomputer which controls zooming and focussing, and controls the exposure and the feeding of photographic film. With such a zoom lens, a variable resistor or potentiometer is used for detecting the stopped position of the movable barrel in order to measure the new focal length of the zoom lens. An analog detecting signal is obtained from the potentiometer, converted in an A/D converter into a digital signal, and inputted to the microcomputer. As the microcomputer effects processes in digits of 8 bits, the A/D converter generates 8-bit signals, each of which represents one datum in only 256 steps.

Focussing a camera having such a zoom lens is performed after zooming, in accordance with the detected focal length, by controlling the compensator. For focussing with high precision, it is necessary precisely to detect the new focal length, even though 256 steps is precise enough for one focussing datum. However, zooming data representing the focal length of one of the 256 steps are inadequately precise when using an 8-bit A/D converter. This gives rise to the problem that the subject is focussed with only low precision. If an A/D converter of over 8 bits were used, it would be possible to represent the focal length in more than 256 steps, but this would necessitate a microcomputer of over 8 bits. Because one particular model of camera incorporates a microcomputer adapted to it, representation of the focal length i more than 256 steps would require the development of an adaptable microcomputer, which would raise the expense of manufacturing the zoom camera.

OBJECTS OF THE INVENTION

In view of the foregoing problems, an object of the present invention is to provide a zoom camera and a method of operating the same, in which the position of the movable barrel as detected can be represented by zooming data in a larger number of steps than can be processed by an A/D converter and microcomputer.

Another object of the present invention is to provide a zoom camera and a method for operating the same, in which a zoom lens system can be focussed with high precision on a subject to be photographed.

Still another object of the present invention is to provide a zoom camera and a method for operating the same, in which the influence of electrical noise in the power supply is reduced.

SUMMARY OF THE INVENTION

In order to achieve the above and other objects and advantages of this invention, an elongated resistor element is arranged in a stationary manner and extends in the direction of movement of the movable barrel means. A first electrode group is connected to the resistor element and is constituted of N electrodes connected in alignment in a longitudinal direction of the resistor element and at a constant interval. To the N electrodes is applied a first potential. A second electrode group is connected to the resistor element and is constituted of N−1 or N electrodes connected in alignment in the longitudinal direction of the resistor element, at a constant interval, and in alternation with the electrodes of the first electrode group. To the N−1 or N electrodes is applied a second potential, which is different from the first potential. The resistor element is divided into resistor areas with reference to the respective electrodes of the first and second electrode groups. A contact segment slides on the resistor element in correspondence with movement of the movable barrel means, and generates a voltage signal representing a contact position within the respective resistor areas. An A/D converter converts the voltage signal from the contact segment into voltage data. Resistor area detecting means detects a location of a resistor area with which the contact segment is in contact. Identifying means identifies the position of the movable barrel means in accordance with the voltage data and a signal from the resistor area detecting means.

Preferably, a counter counts the number of times the rate of change of the voltage signal of the contact segment is changed between positive and negative while the movable barrel means is moved. The rate of change is of the voltage signal to the amount of movement of the contact segment while the contact segment is slid. Control means prevents the contact segment from stopping in the vicinity of positions wherein the electrodes are connected.

In a preferred embodiment, a resistor chip array is arranged in a stationary manner and constituted of M resistor chips arranged in alignment in the direction of movement of the movable barrel means and spaced at a constant interval. The resistor chips all have substantially the same length. A first electrode group is connected to the respective resistor chips and is constituted of M electrodes connected to respective first ends of the resistor chips with reference to the longitudinal direction of arrangement of the resistor chips. To the M electrodes is applied a first potential. A second electrode group is connected to the respective resistor chips and constituted of M electrodes connected to respective second ends opposite to the first ends of the resistor chips. To the M electrodes is applied a second potential, which is different from the first potential. The resistor chip with which the contact segment is in contact is detected, and the position of the movable barrel means is identified in accordance with the voltage data and the position of the detected resistor chip in contact with the contact segment.

The stopped position of the movable barrel as detected can be represented by zooming data in a greater number of steps than the steps which can be processed by the known A/D converter and microcomputer. The zoom lens system can thus be focussed with high precision on the subject to be photographed.

Moreover, the influence of electrical noise in the power source can be reduced while achieving precision in the zooming data, because a plurality of locations for the contact segment are defined with reference to the resistor areas into which the resistor element is divided in a state free from electrical noise, no matter how susceptible the voltage data may be to noise.

BRIEF DESCRIPTION OF THE DRAWINGS

The above and other objects and advantages of the present invention will become more apparent from the following detailed description when read in connection with the accompanying drawings, in which:

FIG. 21 is a flow chart similar to FIGS. 11 and 12, and to FIG. 17, but for the potentiometer of FIG. 18.

DETAILED DESCRIPTION OF PREFERRED EMBODIMENTS OF THE INVENTION

Figure 1:
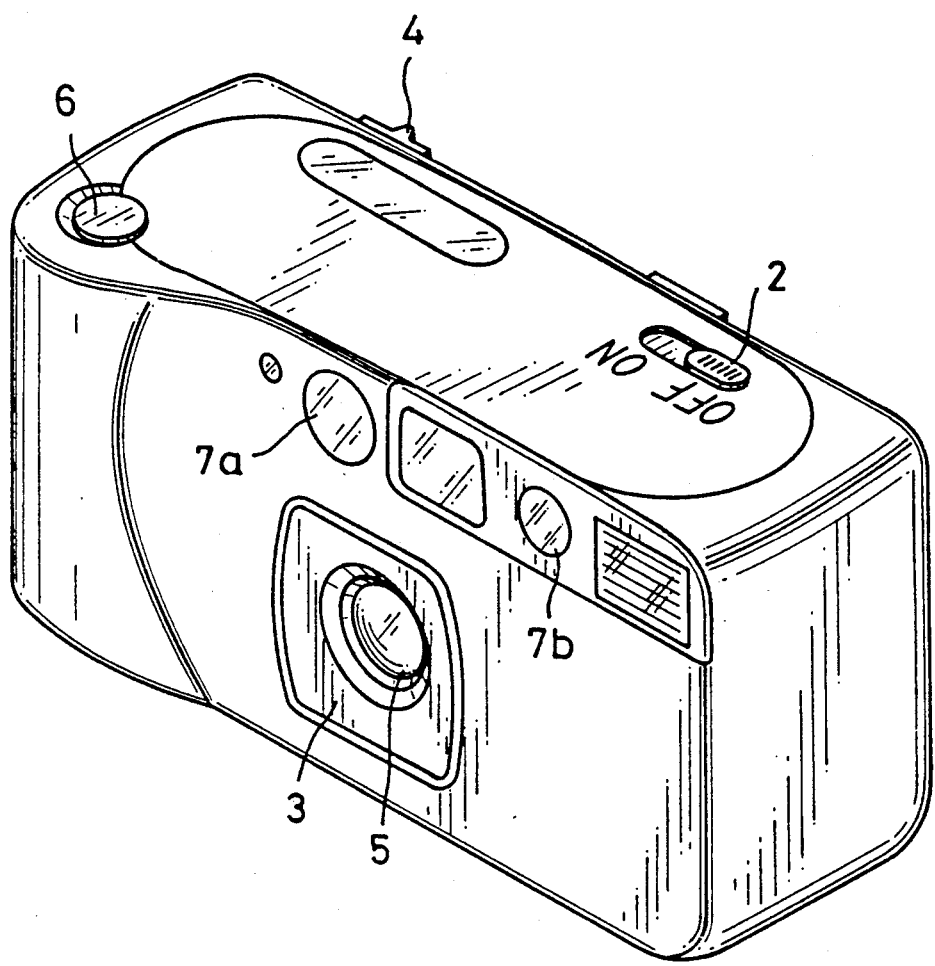
FIG. 1 is a perspective view of a zoom camera according to the present invention.
Figure 2:
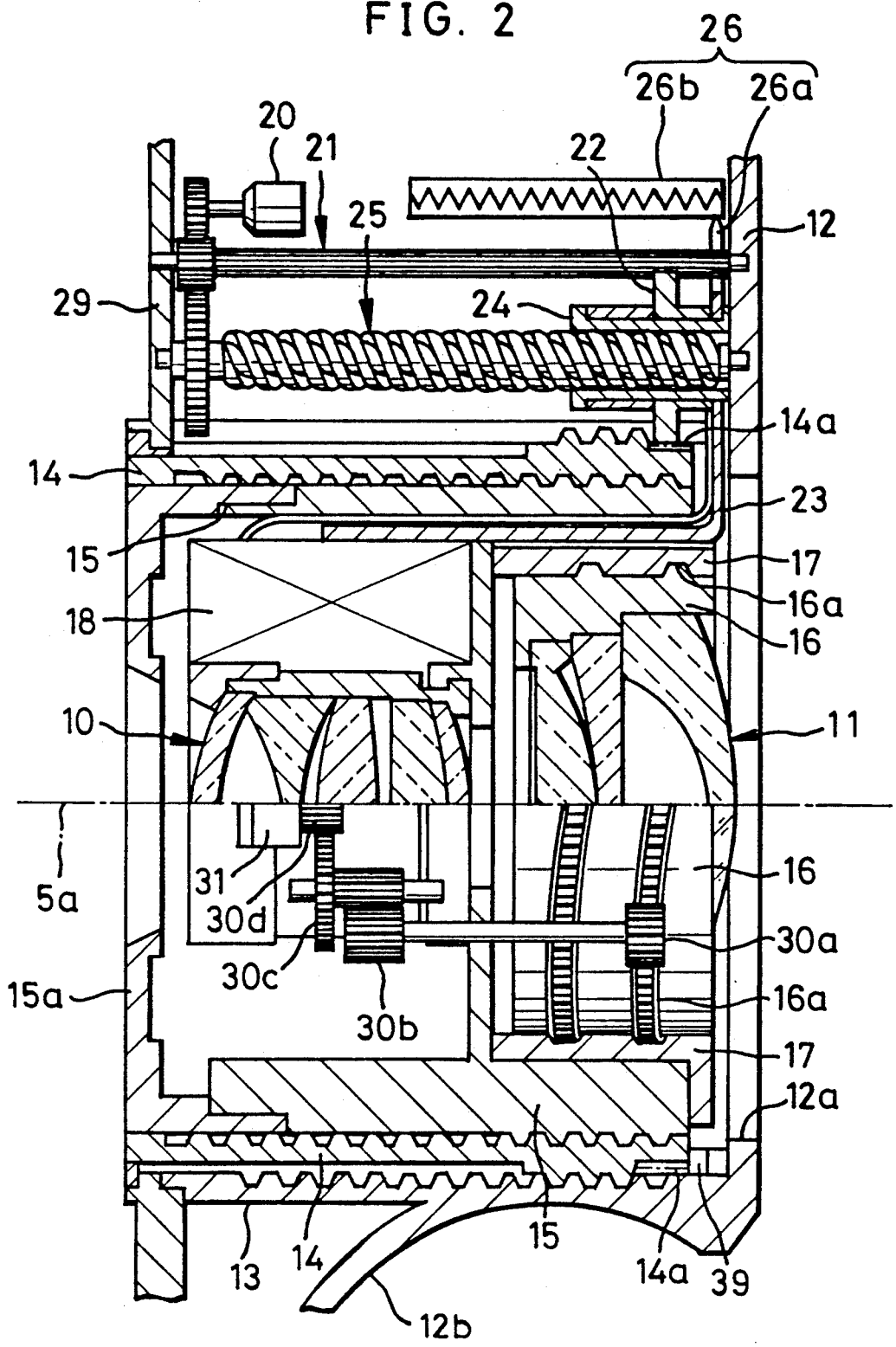
FIG. 2 is a fragmentary cross-sectional view, taken in two vertically spaced horizontal planes, illustrating a zoom assembly and a zoom lens of the camera of FIG. 1, in a collapsed state.
Figure 3:
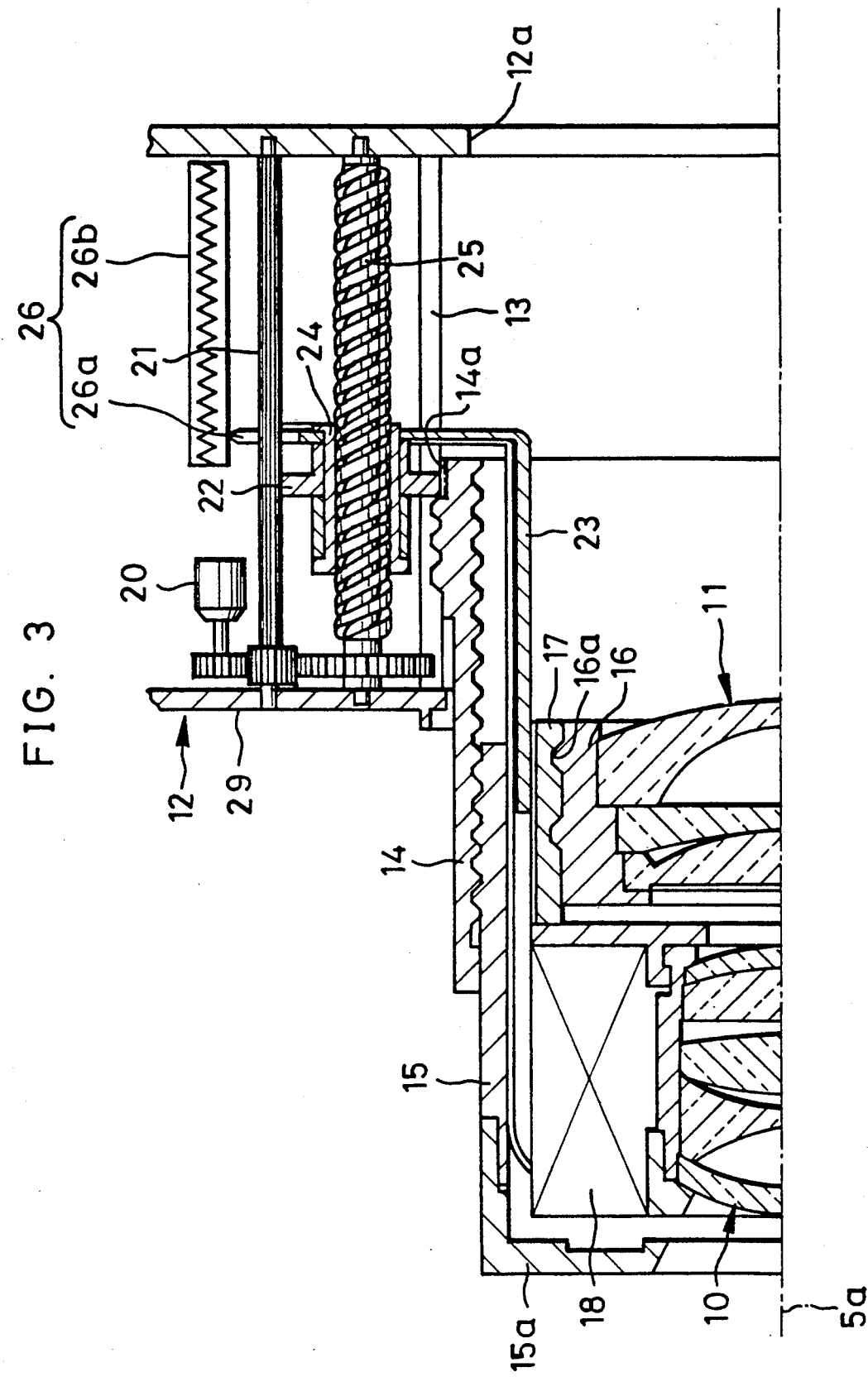
FIG. 3 is a fragmentary cross-sectional view, taken in a horizontal plane, illustrating the zoom assembly in a telephoto state.

Referring now to the drawings, wherein like reference numerals designate like or corresponding parts throughout the several views, FIGS. 1 to 3 show a novel zoom camera according to the present invention. A zoom button 4 is slidable in one horizontal direction for wide-angle photography and in the opposite horizontal direction for telephoto photography, so as to actuate selectively a wide-angle switch 40- or a telephoto switch 41 (see FIG. 4). Operation of the zoom button 4 thus changes a zoom assembly 3 between two limit positions, in order to increase the focal length of a zoom lens system 5 as a taking lens for telephotography, or to reduce it for wide-angle photography. When a shutter button 6 is depressed halfway, the distance and brightness of the subject to be photographed are measured so as automatically to focus the camera on the subject. When the shutter button 6 is depressed fully, the subject is photographed in an in-focus state with appropriate amount of exposure. Reference numerals 7a and 7b designate conventional range finding windows incorporating IR filters. Behind the windows a and 7b, the camera incorporates a range finding unit 46 (see FIG. 4) having an infrared light emitting diode (IRED) and a position detecting diode (PSD), both well known in the art. Designated by 2 is a main switch externally operable to power the camera.

The zoom lens system 5 is of the rear-focussing type, and includes a front lens group 10 as variator composed of five lens elements and a rear lens group 11 as compensator composed of three lens elements. For telephotography, the front and rear lens groups 10 and 11 are moved forward along the optical axis 5a of the zoom lens system 5, to provide a longer focal length. For wide-angle photography, the forward movement of those lens groups 20 and 11 is less. The zoom lens system 5 is collapsed or retracted inside a camera body 12 in a collapsed position. The rear lens group 11 is used for correcting the shift of focus caused by zooming, and for focussing in cooperation with an autofocus (AF) system.

The camera body 12 is integrally formed with a stationary barrel 13. An intermediate movable barrel 14 is provided with an external helicoidal thread, which engages with an internal helicoidal thread formed in the stationary barrel 13. When caused to rate, the intermediate barrel 14 moves back and forth according to the pitch or lead of its external thread. An innermost movable barrel 15 is provided with an external helicoidal thread, which engages with an internal helicoidal thread formed in the intermediate barrel 14. When caused to rotate, the innermost barrel 15 moves back and forth according to the pitch or lead of its external thread. Designated by 15a is a cover frame attached to the front of the innermost barrel 15.

The helicoidal mechanism coupling the intermediate barrel 14 with the stationary barrel 13 permits the intermediate barrel 14 to move axially only in the direction of the optical axis 5a when rotated in the stationary barrel 13. The helicoid mechanism coupling the innermost barrel 15 with the intermediate barrel 14 permits the innermost barrel 15 to move axially only in the axial direction 5a from within the intermediate barrel 14 at most to a telephoto limit position in which the focal length is the longest, shown in FIG. 3. Innermost barrel 15 is movable only rectilinearly, because a rectilinear regulating arm 23 prevents the innermost barrel 15 from rotating.

The camera body 12 is provided with a film supply chamber 12b and other conventional structure which is also formed integrally with the camera body 12. Therefore, the camera incorporating the present zoom assembly 3 is rather compact compared with cameras using conventional zoom lens assemblies. Designated by 12a is an exposure aperture formed in the camera body 12.

As is shown in FIGS. 2 and 3, a gear shaft or splined shaft 21 and a feed screw 25 with a helical groove are rotatably supported between a front cover 29 and the camera body 12. The splined shaft 21 has a splined portion and a gear portion, which is formed integrally with the splined portion and has a larger diameter. The gear portion of the splined shaft 21 meshes with the gear of a zoom motor 20, whereas the splined portion has a length covering the maximum of axial movement of a gear portion 14a of the intermediate barrel 14. The feed screw 25 is provided with a front gear, which meshes with the gear portion of the splined shaft 21. The feed screw 25 fits into a bush 24, which has internal helicoid threads engaged in the helical groove of the feed screw 25. The bush 24 is supported on the feed screw 25 and is movable axially with the intermediate barrel 14. A pinion 22 is rotatably mounted around the bush 24, and meshes with the gear portion 14a of the intermediate barrel 14. The rectilinear regulating arm 23 is secured to the bush 24, and is fitted in a groove formed in the inside of the innermost barrel 15, so that the innermost barrel 15 moves back and forth rectilinearly, that is, without rotation, along the rectilinear regulating arm 23. On the rear of the bush 24 is mounted a contact segment or brush 26a, which is adapted to slide in contact with a resistor element 26b arranged in the direction of movement of the zoom assembly 3, and constitutes therewith a variable resistor serving as a potentiometer 26.

The zoom motor 20, in response to operation of the zoom button 4, causes the splined shaft 21 and the feed screw 25 to rotate. Because the pinion 22 meshes with the splined portion of the splined shaft 21, the pinion 22 is also rotated, and rotates in turn the intermediate barrel 14. Because of its helical engagement with the stationary barrel 13, rotation of the intermediate barrel 14 moves it axially. At the same time, the rotation of the feed screw 25 causes the bush 24 to move with the pinion 22 in the axial direction, so that the pinion 22 and the gear portion 14a move together, thus maintaining the engagement therebetween.

When the main switch 2 of the camera is still off, the zoom assembly 3 is positioned in the collapsed position as shown in FIG. 2. In this position, the innermost barrel 15 and the intermediate barrel 14 are accommodated within the stationary barrel 13. When the main switch 2 is turned on, the zoom assembly 3 is automatically placed in a wide-angle limit position in which the focal length is the shortest and the intermediate barrel 14 and the innermost barrel 15 protrude slightly from the front cover 29. To achieve the barrels 14 and 15, the zoom motor 20 rotates forwardly, so that the splined shaft 21 rotates to cause the intermediate barrel 14 to rotate relative to the stationary barrel 13, through the engagement of the pinion 22 with the gear portion 14a. Although the intermediate barrel 14 moves forward while being rotated, rotation of the feed screw 25 moves the bush 24 forward without rotation. Thus the pinion 22 is maintained engaged with the gear portion 14a. The innermost barrel 15, which otherwise would rotate with the intermediate barrel 14, cannot rotate because of the rectilinear regulating arm 23. The arm 23 in the groove in the innermost barrel 15, as previously explained, guides the innermost barrel 15 to move rectilinearly. The rectilinear regulating arm 23 advances together with the intermediate barrel 14, because the arm 23 is fixedly mounted on the bush 24.

The front lens group 10 is held by a lens holder which is fixedly coupled to the innermost barrel 15. The rear lens group 11 is held by a lens holder 16 which is helically coupled to the inside of a holder support 17. Designated by 18 is a shutter block. The holder support 17 is fixedly fitted in the innermost barrel 15 at the rear of the innermost barrel 15. On the inside of the holder support 17, there is formed an internal helicoidal thread, which engages with an external helicoidal thread 16a formed around the lens holder 16. The external thread 16a has gear teeth formed on the crest thereof so that the external thread 16a serves also as a helicoidal rack, which engages with gear 30a. Through cooperation of gears 30b to 30d, rotational movement of a focussing motor 31 is transmitted to the lens holder 16. The focussing motor 31 is secured to the outside of the lens holder of the front lens group 10. In this way, the lens holder 16 supporting the rear lens group 11 is rotated by the focussing motor 31 so as to move back and forth according to the pitch or lead of the external thread 16a during zooming. Backward and forward movement of the rear lens group 11 maintains the in-focus state despite zooming.

Figure 4:
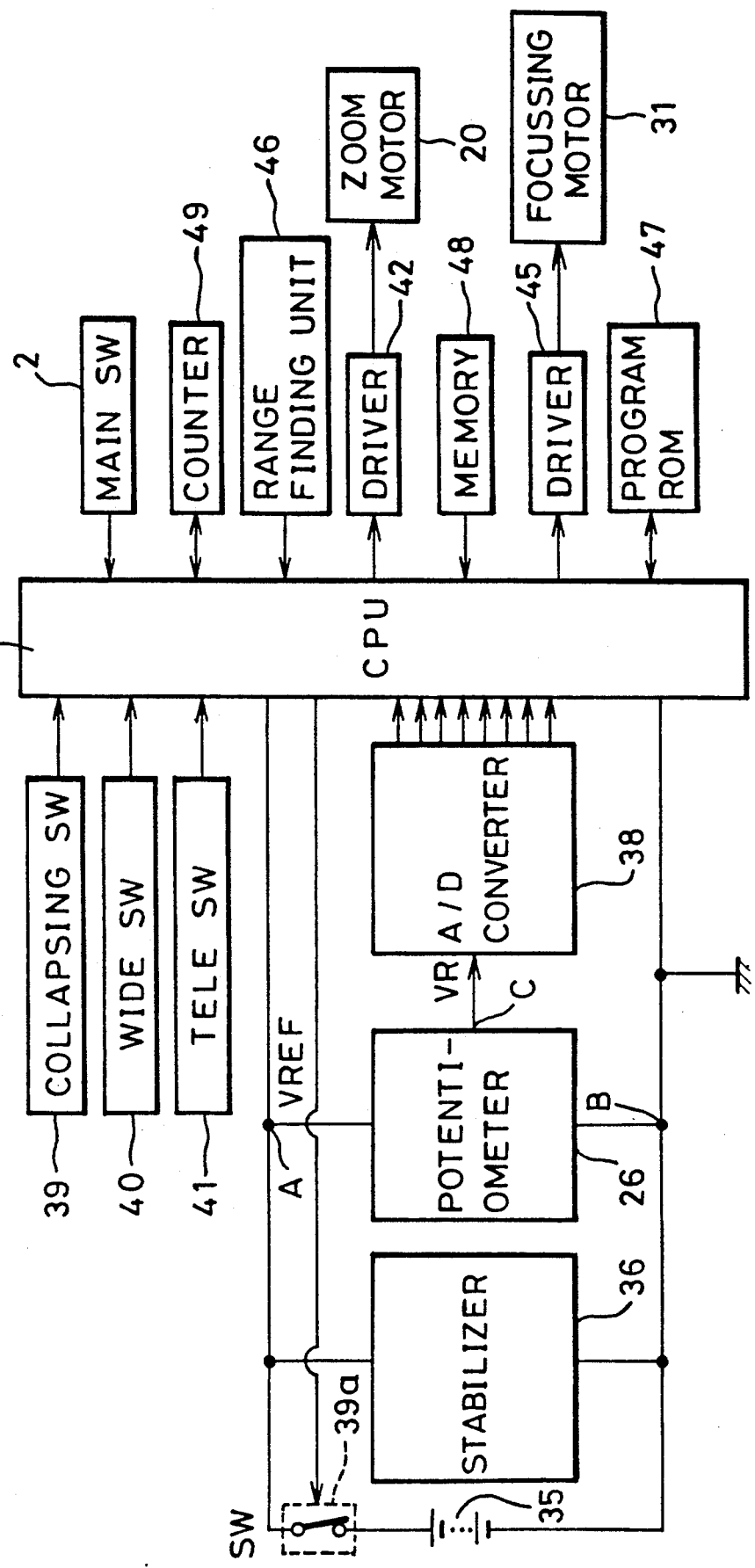
FIG. 4 is a schematic diagram illustrating the arrangement of the electrical circuit of the camera.

FIG. 4 illustrates the circuit of the novel zoom camera. A power source or battery 35 is connected via a battery switch 39a to a stabilizer circuit 36, which is adapted to maintain stable a voltage VREF. The switch 39a is actuated upon actuation of the main switch 2. When the main switch 2 is turned OFF, the switch 39a remains ON until a collapsing switch 39 is turned ON. The collapsing switch 39 is adapted to be actuated in response to movement to the rear of the intermediate barrel 14 for the purpose of causing a CPU 37 to turn off the battery switch 39a.

The stabilizer 36 is connected to the potentiometer 26 and the CPU 37 for controlling positions of the zoom assembly 3, and stabilizes the voltage to be applied to them. The brush 26a of the potentiometer 26 is connected to an 8-bit analog/digital converter 38 in which 256 steps are resoluble. To lessen errors in conversion, the potential difference between zero and the VREF to be digitalized are detected not in 256 steps but in 64 steps. An analog voltage VR (where $0 \leq VR \leq VREF$) generated at the brush 26a is converted in A/D converter 38 to a digital voltage VR(PORT), which is sent to the CPU 37. The digital voltage VR(PORT) is read as VR into the CPU 37 by means of the interruption of the timer.

Figure 5:
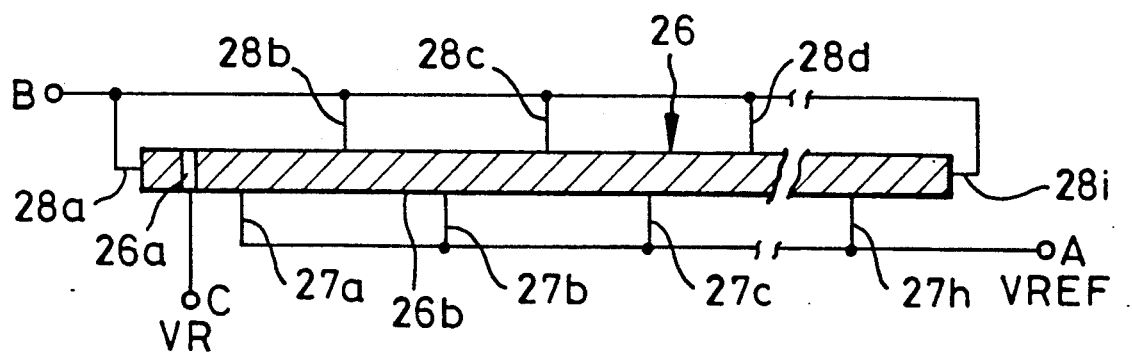
FIG. 5 is a schematic view illustrating a potentiometer for use in the novel camera.
Figure 6:
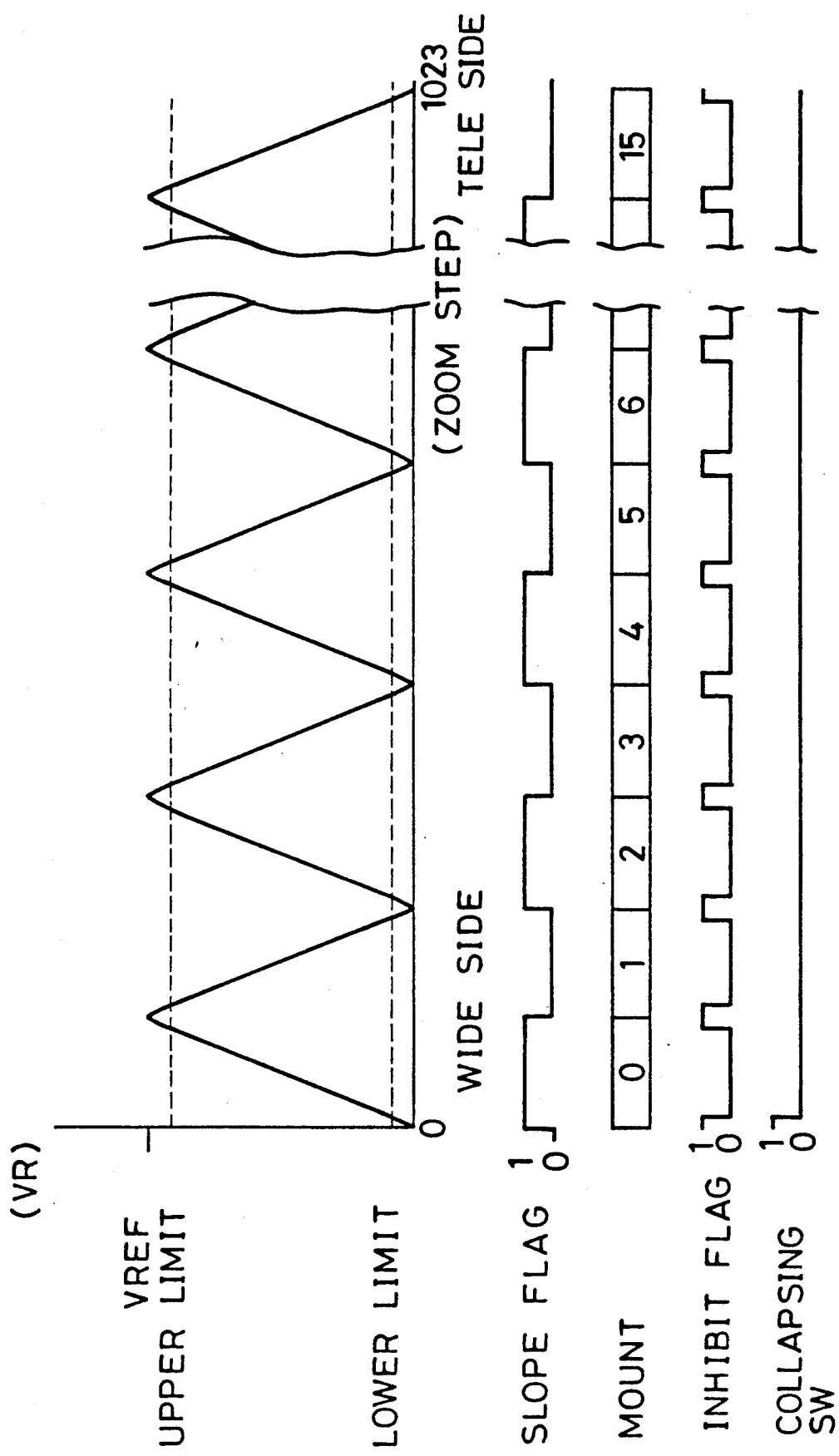
FIG. 6 is an explanatory view illustrating the operation of the circuit of FIG. 4 during zooming.

In FIG. 5, which shows the structure of the potentiometer 26, there are connected seventeen electrodes at a constant interval. The eight electrodes 27a, 27b, ..., 27h of the even numbers of the seventeen are connected to terminal A where a potential of VREF is applied. The nine electrodes 28a, 28b, ..., 28i of the odd numbers are connected to terminal B and so are grounded. When the brush 26a is slid on the resistor element 26b from end to end thereof, the voltage VR of the brush 26a changes, alternating regularly, increasing and decreasing, as illustrated in FIG. 6. According to this embodiment, the resistor element 26b is split into sixteen areas. The rate of change of the voltage VR, relative to the amount of movement of the brush 26a, is linear within each area. Each of the sixteen areas is further split into 64 sub-areas, which correspond with the above 64 steps in voltage and are designated as ZOOM STEP in the range from zero to 63. The ZOOM STEP for all the resistor element 26b, therefore, can designate a zooming datum of the zoom assembly 3 according to a 1024-step representation, from zero to 1023.

The potentiometer 26 lacks linearity of resistance in the vicinity of the positions of connection of the electrodes 27a to 27h and 28a to 28i. The voltage VR as detected regularly in the vicinity of the electrodes is unreliable. To cope with this problem, the CPU 37 compares VR with reference values UPPER LIMIT and LOWER LIMIT as predetermined for limits of the reliable voltage. If the CPU 37 judges that "VR<LOWER LIMIT" or "VR>UPPER LIMIT" then the zoom motor 20 is successively rotated even when the zoom button 4 is released. Successive rotation of the zoom motor 20 inhibits the brush 26a from stopping at any of the electrodes. When the CPU 37 judges that "LOWER LIMIT≦VR≦UPPER LIMIT", then the zoom motor 20 is allowed to stop because brush 26a is sufficiently spaced from the electrodes.

Avoidance of the brush 26a stopping in the vicinity of the electrodes is controlled according to the setting of an INHIBIT FLAG, by the CPU 37. When "VR<LOWER LIMIT" or "VR>UPPER LIMIT", then INHIBIT FLAG is 1. When "LOWER LIMIT≦VR≦UPPER LIMIT", then INHIBIT FLAG is zero. Let DIR FLAG be 1 when the zoom motor 20 is driven in the telephoto direction, and be zero when the zoom motor 20 is driven in the wide-angle direction. The CPU 37 keeps DIR FLAG unchanged, even when the zoom button 4 is released while INHIBIT FLAG is 1.

Figure 7:
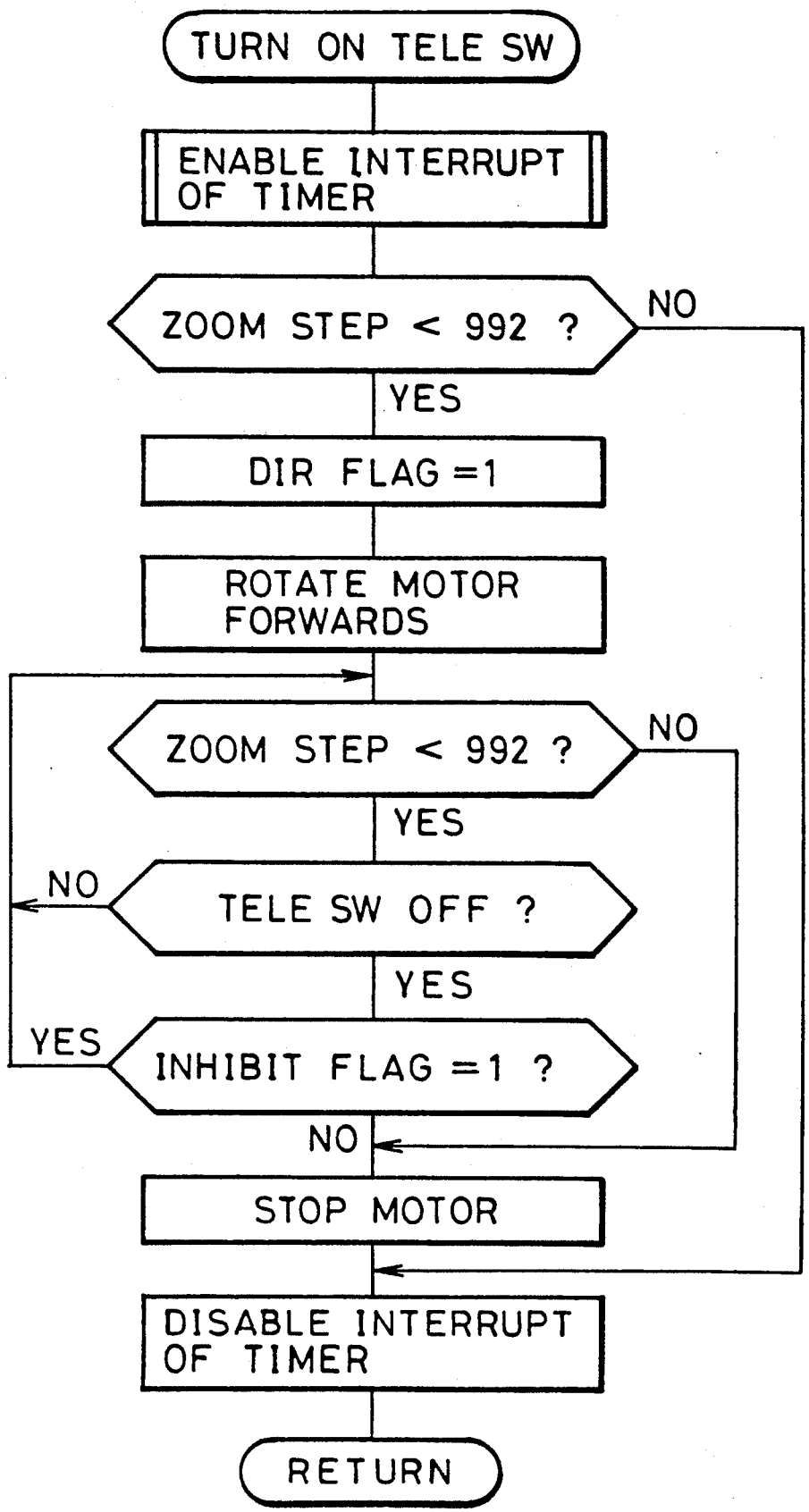
FIG. 7 is a flow chart illustrating the control of movement of the zoom assembly toward the telephoto position.
Figure 8:
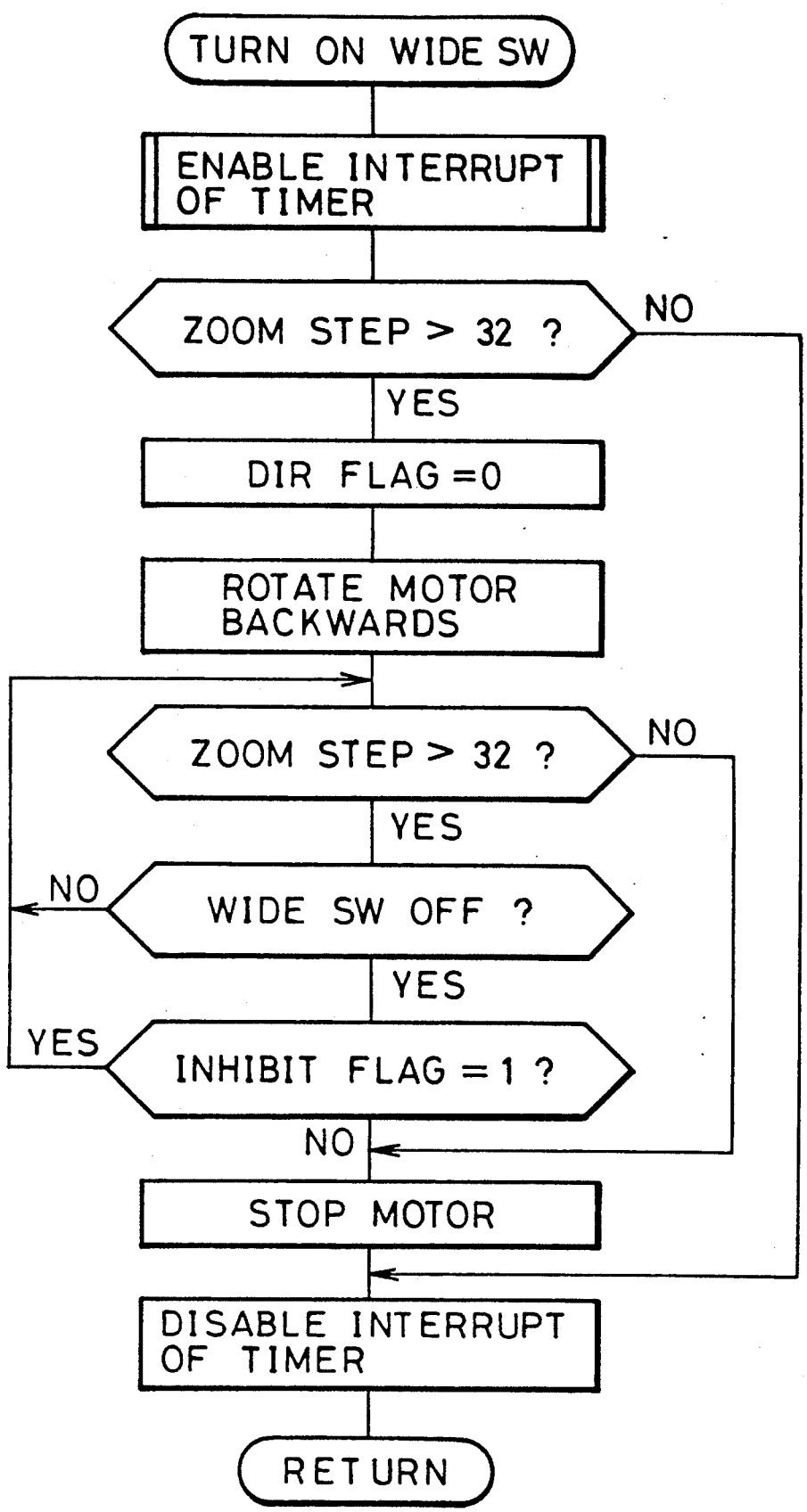
FIG. 8 is a flow chart similar to that of FIG. 7 but for movement toward the wide-angle position.

To the CPU 37 are connected the wide-angle switch 4- and the telephoto switch 41, both actuable exclusively through the zoom button 4. When the telephoto switch 41 is actuated, then the CPU 37 outputs "DIR FLAG=1" to a driver 42, which in turn rotates the zoom motor 20 forwardly as illustrated in FIG. 7, to move the innermost barrel 15 in the telephoto direction. When the wide-angle switch 40 is actuated, then the CPU 37 outputs "DIR FLAG+0" to the driver 42, which in turn rotates the zoom motor 20 reversely as illustrated in FIG. 8, to move the innermost barrel 15 in the wide-angle direction.

Figure 9:
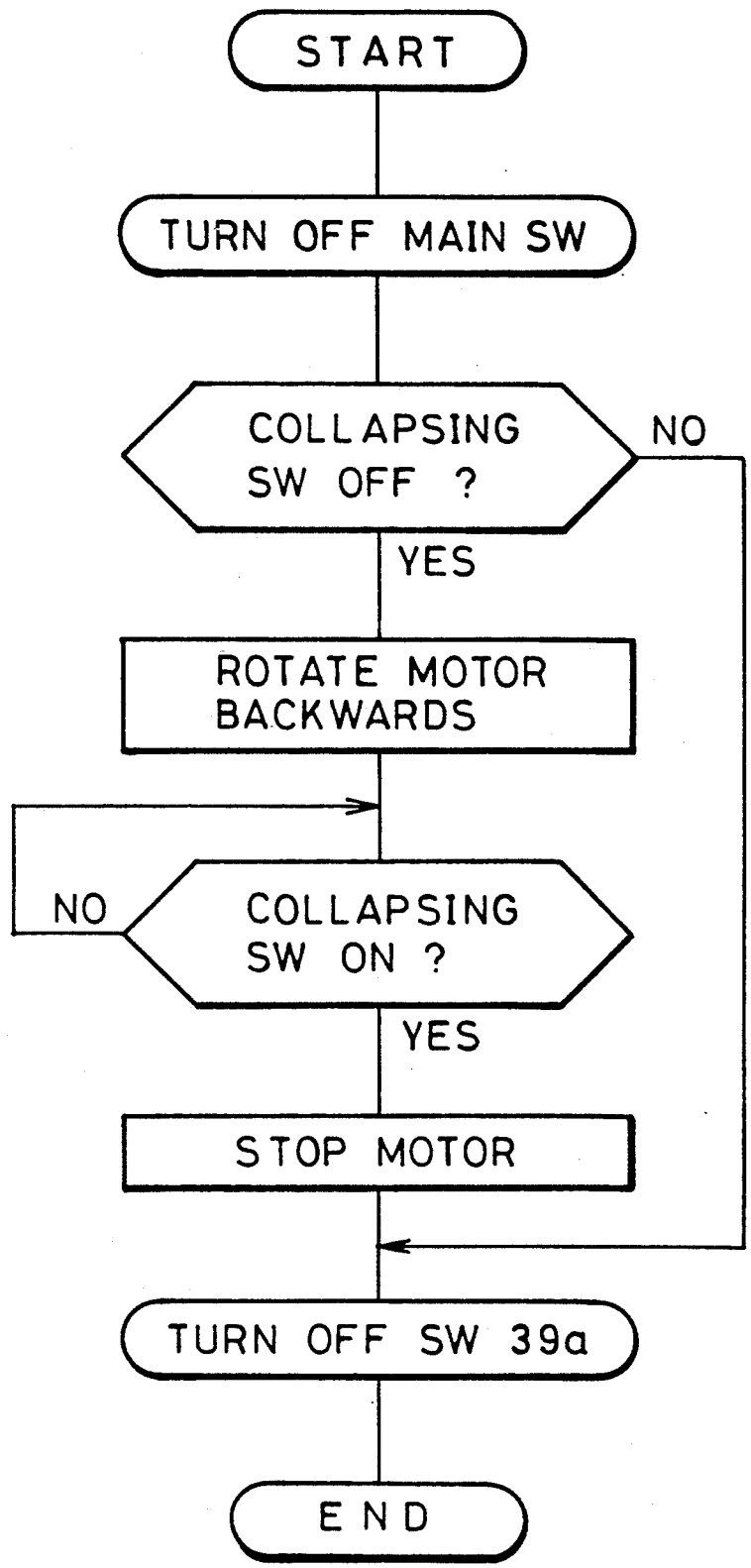
FIG. 9 is a flow chart illustrating the control of return movement of the zoom assembly to a collapsed position.

Turning ON of the main switch 2 moves the innermost barrel 15 from the collapsed position toward the telephoto limit position. As illustrated in FIG. 9, turning OFF of the main switch 2 moves back the innermost barrel 15 to the collapsed position. When the innermost barrel 15 is moved to the collapsed position, that is, the wide-angle limit position, and then to the telephoto limit position, then the brush 26a is moved to meet respectively "ZOOM STEP=0", "ZOOM STEP=32" and "ZOOM STEP=992".

The focussing motor 31 is also connected to the CPU via a driver 45. The focussing motor 31 is controlled in accordance with the AF signal generated from the rangefinding unit 46 for representing the distance of the photographic subject. To the CPU 37 are connected a program ROM 47, a memory 48 and a counter 49. The memory 48 stores values of the above DIR FLAG, INHIBIT FLAG, and LASTVR, SLOPE FLAG to be described later. The counter 49 identifies the position of the brush 26a by designating one of the sixteen areas, which are represented by MOUNT, which is a number from zero to 15.

LASTVR is a value of VR as read at the previous time of interruption of the timer. LASTVR is renewed at each interruption of the timer, and stored in the memory 48. To detect the change in output from the brush 26a, the CPU 37 compares LASTVR with VR. The change in output from the brush 26a is used with DIR FLAG in order to determine the value of SLOPE FLAG. SLOPE FLAG is zero, when VR is decreasing and DIR FLAG is 1, otherwise, when VR is increasing and DIR FLAG is zero. SLOPE FLAG is 1, when VR is decreasing and DIR FLAG is zero, otherwise, when VR is increasing and DIR FLAG is 1. In other words, the slope or gradient of VR as illustrated in FIG. 6 rises to the right when SLOPE FLAG is 1, and falls to the right when SLOPE FLAG is zero.

A change in slope flag represents a movement of the brush 26a by one electrode. The CPU 37 compares the presently determined value of SLOPE FLAG with the previously determined value of SLOPE FLAG (hereinafter referred to as LASTSLOPE FLAG). The CPU 37 also judges the value of DIR FLAG, so as to detect the direction of movement of the brush 26a. When DIR FLAG is 1, then the brush 26a is judged to move in the direction for increasing MOUNT. When DIR FLAG is zero upon movement of the brush 26a, then it is judged to move in the direction for decreasing MOUNT.

Figure 10:
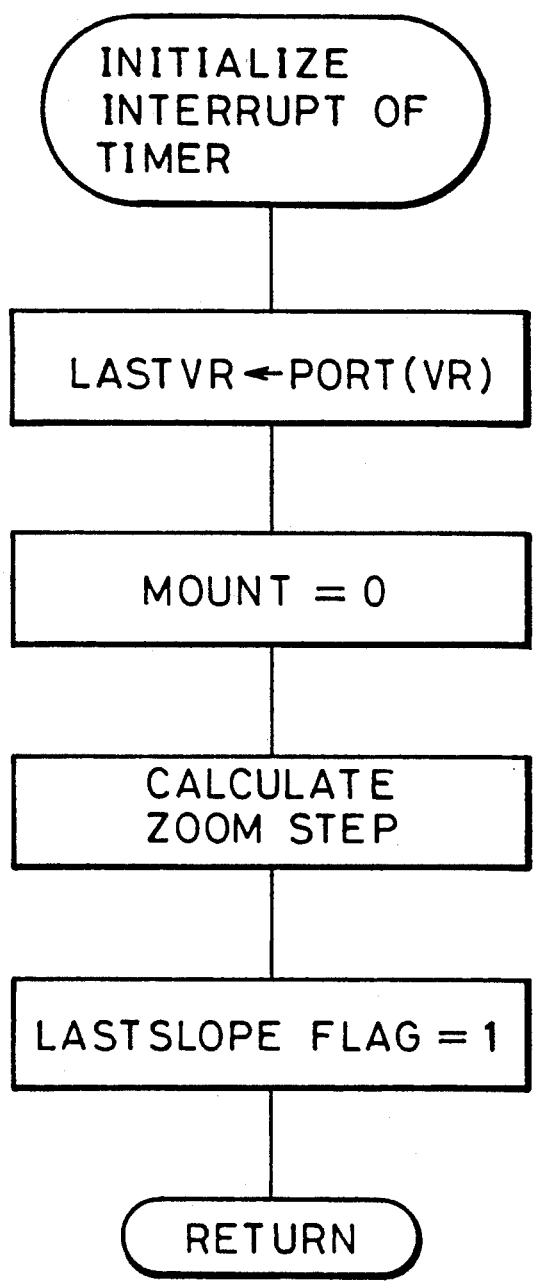
FIG. 10 is a flow chart illustrating the control of starting interruption of the timer.

Interruption of the timer is initiated by the CPU 37 when the main switch 2 is actuated, as illustrated in FIG. 10. For this initiation, the memory 48 is caused to store "LASTSLOPE FLAG=1" and the value as read of VR at LASTVR. A value of ZOOM STEP is calculated on the basis of the following Equations 1) and 2), wherein n is 0, 1, 2, ..., 6, 7.

If MOUNT=2n, then ZOOM
STEP=(MOUNT+VR/VREF)×64; (1)

If MOUNT=2n+1, then ZOOM
STEP=(MOUNT+1−VR/VREF)×64. (2)

At the time of initiation of interruption of the timer, the CPU 37 resets the counter 49 to zero. When the brush 26a passes a connected position of one electrode in the direction to increase MOUNT, the CPU 37 causes the counter 49 to increment by one. When the brush 26a passes a connected position of one electrode in the direction to decrease MOUNT, the counter 49 is caused to decrement by one. Thus the count represented in the counter 49 corresponds to the value of MOUNT representing the contact of brush 26a. Therefore, ZOOM STEP, in accordance with the present invention, can designate 1024 values even when using an A/D converter 38 having a word length of 8 bits, because the position of the brush 26a is detected in the 16 steps prior to digitalization in the A/D converter 38.

Figure 11:
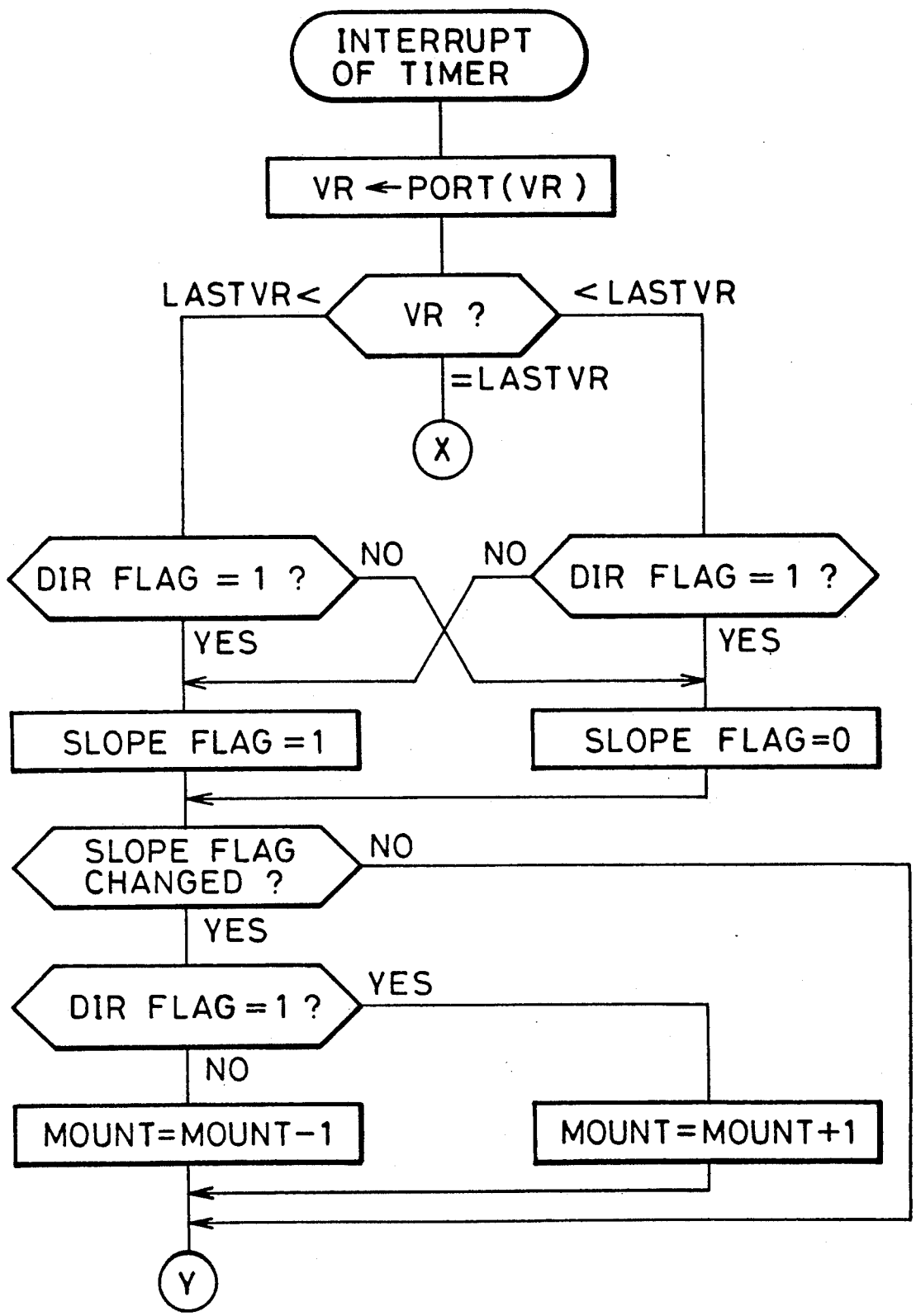
FIG. 11 is a flow chart illustrating the control of counting in the counter.
Figure 12:
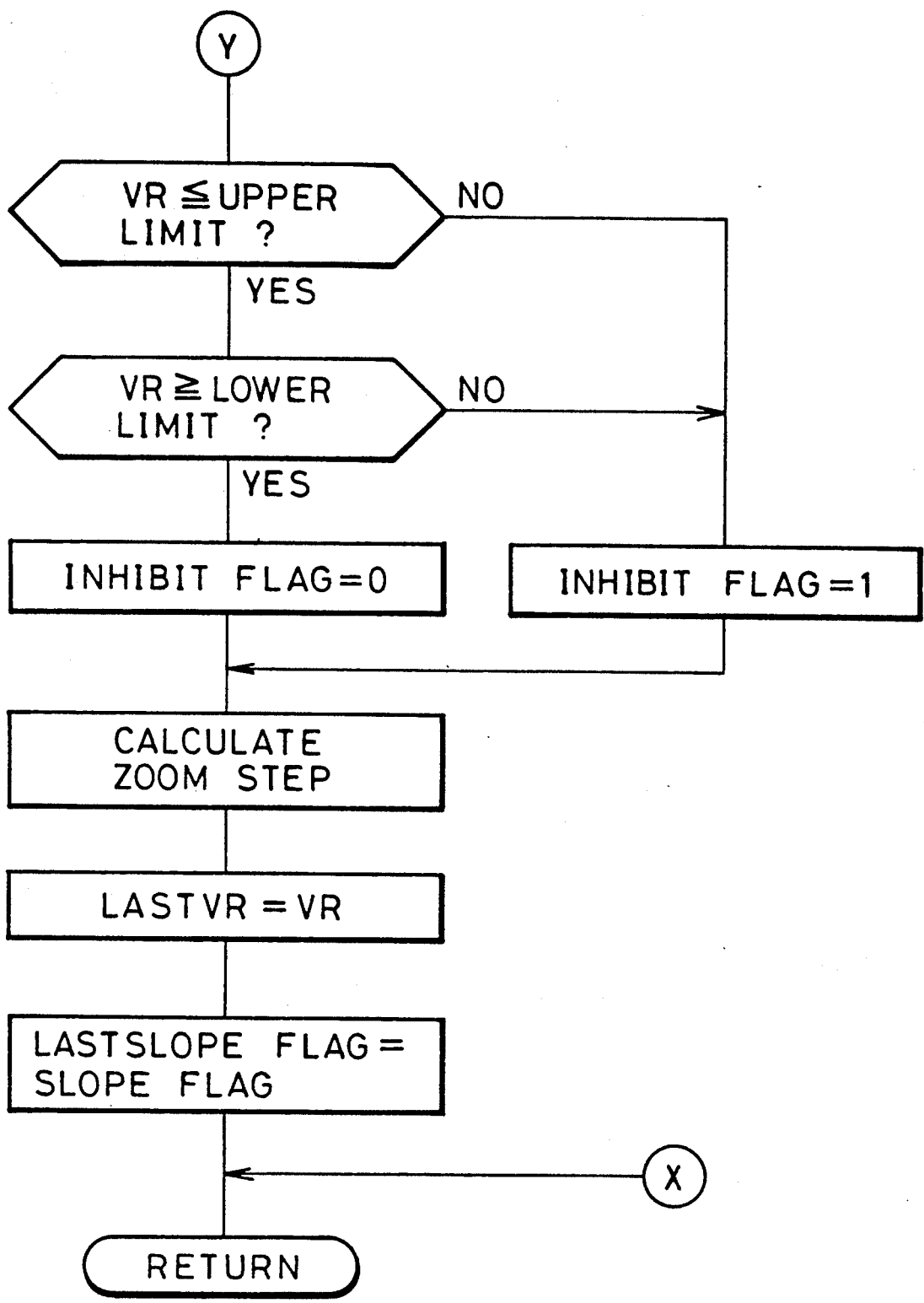
FIG. 12 is a flow chart of the time sequence following that of FIG. 11 and illustrating the control of inhibiting a brush from stopping.

The operation of the novel zoom camera will now be described with reference to FIGS. 11 and 12. When the main switch 2 is turned on, the CPU 37 reads a control program out of the program ROM 47, and initiates the interruption of the timer. Upon the lapse of a short period of time, interruption of the timer is carried out and VR is read to check the collapsed position. The zoom motor 20 is rotated forwardly to move the innermost barrel 15 from the collapsed position to the wide-angle limit position. During the forward movement of the innermost barrel 15, VR increases, with "SLOPE FLAG=1" and "MOUNT=0" unchanged. When ZOOM STEP rises to 31, the CPU 37 stops rotation of the zoom motor 20, to stop the innermost barrel 15 in the wide-angle limit position. When the zoom motor 20 stops rotating, the interruption of the timer is terminated.

When the telephoto switch 41 is turned on by operation of the zoom button 4, the CPU 37 performs an interruption of the timer again, as interruption of the timer is being performed by the CPU 37 in a repetitive manner over a short period of time. The CPU 37 outputs "DIR FLAG=1" to the driver 42. The zoom motor 20 is again rotated forwardly, to move the innermost barrel 15 toward the telephoto limit position. It should be noted that, should the wide-angle switch 40 be turned on inadvertently while the innermost barrel 15 is in the wide-angle limit position, the zoom motor 20 will not be reversely rotated, as shown in FIG. 8.

VR as read in by the interruption of the timer is increased. When VR becomes over UPPER LIMIT, then the CPU 37 sets "INHIBIT FLAG=1", retains "DIR FLAG=1" and inhibits the zoom motor 20 from stopping. The brush 26a then passes the connected position of the electrode 27a of potential VREF and moves into the area represented by "MOUNT=1", then SLOPE FLAG is zero. "DIR FLAG=1" remaining, the count in the counter 49 is incremented by one, to become 1.

During movement of the brush 26a through the region of "MOUNT=1", VR decreases. When VR becomes UPPER LIMIT or below, then INHIBIT FLAG is zero to enable the zoom motor 20 to stop. During further forward rotation of the zoom motor 20, VR falls below LOWER LIMIT, thereby to set "INHIBIT FLAG=1" so that the zoom motor 20 is inhibited from stopping. The brush 26a then passes the connected position of the electrode 28b of potential zero and moves into the area represented by "MOUNT=2", then SLOPE FLAG is 1. The count in the counter 49 is incremented by one, to become 2. The interruption of the timer is then terminated.

During movement of the brush 26a through the region of "MOUNT=2", VR increases. When VR becomes LOWER LIMIT or over, then INHIBIT FLAG is zero to enable the zoom motor 20 to stop. Similar operations follow repetitively. Let the brush 26a pass the area of "MOUNT=5", and while INHIBIT FLAG is zero, the telephoto switch 41 is turned off. The zoom motor 20 is stopped, to stop the innermost barrel 15 from moving. The brush 26a is situated between the electrodes 27c and 28d.

The A/D converter 38 outputs to the CPU 37 a digital voltage PORT(VR) representing a step of "40". The CPU 37 finds VR/VREF=40/64, and obtains MOUNT=5 from the counter 49, and uses the equation "ZOOM STEP=(MOUNT+1−VR/VREF)×644", to obtain ZOOM STEP as 344, which designates the particular position of the brush 26a, for representation of a zooming datum of the innermost barrel 15. This zooming datum is sent to the CPU 37. When the shutter button 6 is halfway depressed, the CPU 37 processes the zooming datum and the subject distance from the range-finding unit 46 so as to obtain the above-mentioned AF signal. When the AF signal is sent form the CPU 37 to the driver 45, the focussing motor 31 is rotated to move the rear lens group 11 to an in-focus position. The shutter button 6 is then fully depressed, so as to operate the shutter of the camera to be opened and closed to effect an exposure. A photograph having been taken, the photographic film is wound up by one frame, so as to be ready for another exposure.

Reference is now made to the zooming operation in the wide-angle direction. The wide-angle switch 40 is turned on. The CPU 37 performs again the interruption of the timer, outputs "DIR FLAG=0" to the driver 42, and rotates the zoom motor 20 reversely to move the innermost barrel toward the wide-angle limit position. Note that, should the telephoto switch 41 be turned on inadvertently while the innermost barrel 15 is in the telephoto limit position, the zoom motor 20 is never rotated forwardly as illustrated in FIG. 7.

VR, as read in by the interruption of the timer, is increased. When VR becomes greater than UPPER LIMIT, then the CPU 37 sets "INHIBIT FLAG=1", retains "DIR FLAG=0" and inhibits the zoom motor 20 from stopping. In due course thereafter, the brush 26a passes the connected position of the electrode 27c of potential VREF and moves into the region represented by "MOUNT=4", then "SLOPE FLAG=1" is set. As DIR FLAG is zero, the counter 49 is decremented by one, to count 4.

During movement of the brush 26a through the region of "MOUNT=4", VR decreases. When VR becomes UPPER LIMIT or below, then INHIBIT FLAG is zero to enable the zoom motor 20 to stop. While INHIBIT FLAG is zero, the wide-angle switch 40 is turned off. The zoom motor 20 is stopped, to stop the innermost barrel 15 from moving. The brush 26a is situated between the electrodes 27c and 28c.

The A/D converter 38 outputs to the CPU 37 a digital voltage PORT(VR) representing a step of "30". The CPU 37 finds VR/VREF=30/64, and obtains MOUNT=4 from the counter 49, and uses the equation "ZOOM STEP=(MOUNT+VR/VREF)×64", to obtain ZOOM STEP as 286, designating the stopped position of the brush 26a. The zooming datum is sent to the CPU 37. When the shutter button 6 is halfway depressed, the CPU 37 sends the AF signal to the driver 45. The focussing motor 31 is rotated to move the rear lens group 11 to an in-focus position for effecting an exposure.

To take another photograph, the zoom button 4 is operated for zooming the camera in a similar manner. When a photographer desires to stop taking photographs and collapse the camera, the main switch 2 is turned off. The CPU 37, following the routine illustrated in FIG. 9, rotates the zoom motor 20 reversely to move the innermost barrel 15 beyond the wide-angle limit position to the collapsed position, until the intermediate barrel 14 turns on the collapsing switch 39. When the collapsing switch 39 is turned on, the battery switch 39a is turned off.

Figure 13:
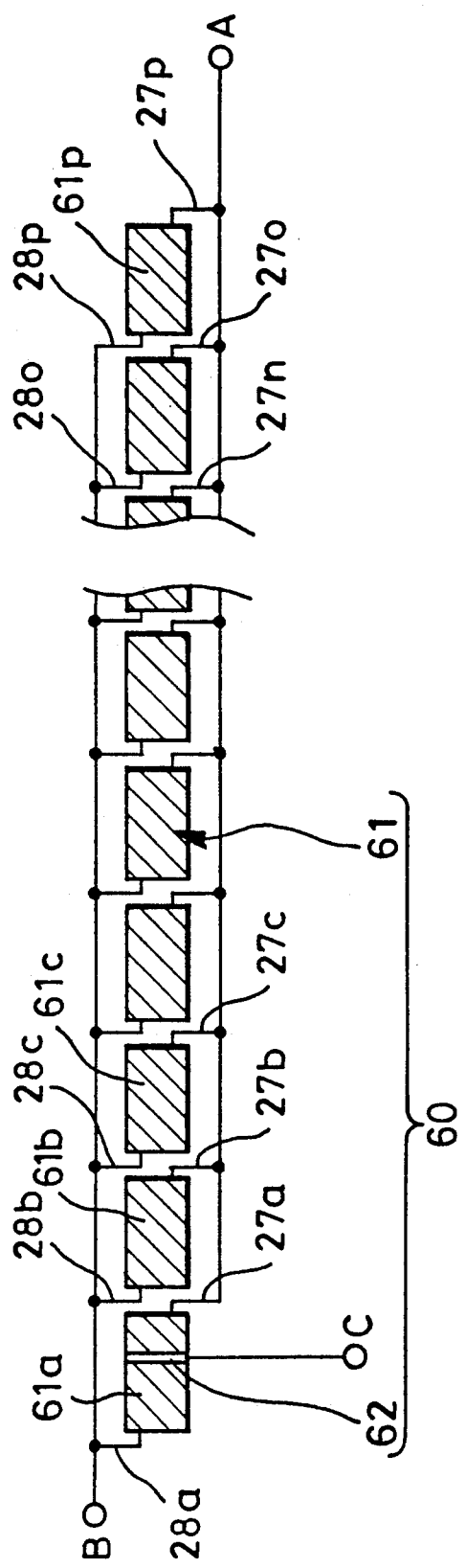
FIG. 13 is a schematic view illustrating another potentiometer for use in the novel camera.

FIG. 13 illustrates another potentiometer 60 in use with the novel zoom camera. Elements similar to the preceding embodiment are designated with identical reference numerals. The camera is provided with an array 61 of sixteen resistor chips 61a, 61b, 61c, ..., 61o, 61p aligned in the zooming direction and spaced at a constant interval. On the rear of the bush 24 is mounted a brush 62, which is adapted to slide in contact with the array 61 of the resistor chips 61a to 61p, and constitutes therewith the potentiometer 60. On one side of the resistor chips 61a to 61p, there are connected sixteen electrodes 27a, 27b, ..., 27p, which are connected to terminal A where the potential of VREF is applied. On the other side of the resistor chips 61a to 61p, there are connected sixteen electrodes 28a, 28b, ..., 28p, which are connected to terminal B and so are grounded. The interval between the resistor chips 61a to 61p is greater than the width of the contact head of the brush 62.

Figure 14:
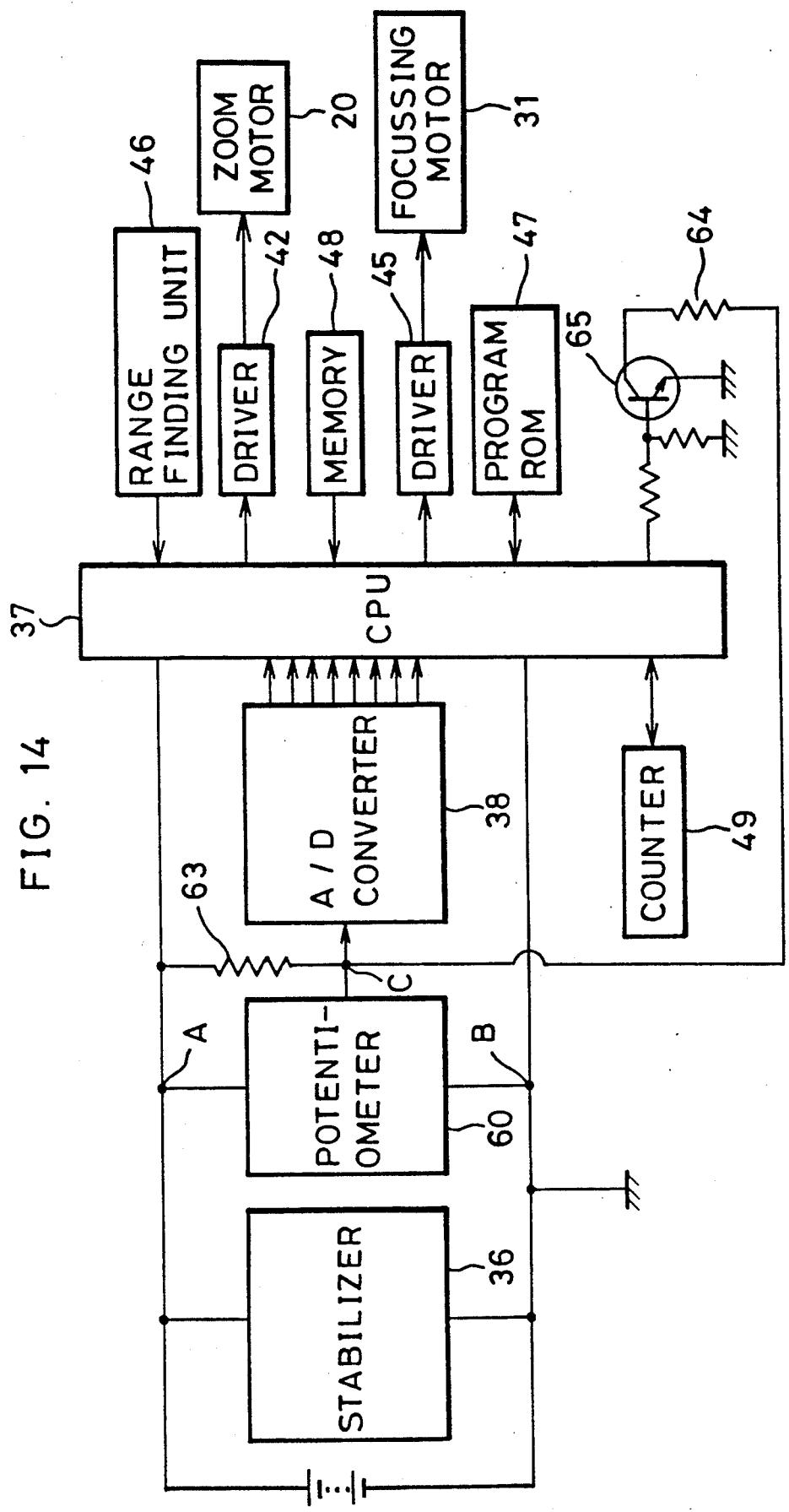
FIG. 14 is a schematic diagram illustrating the arrangement of the circuit of the camera of FIG. 13.
Figure 15:
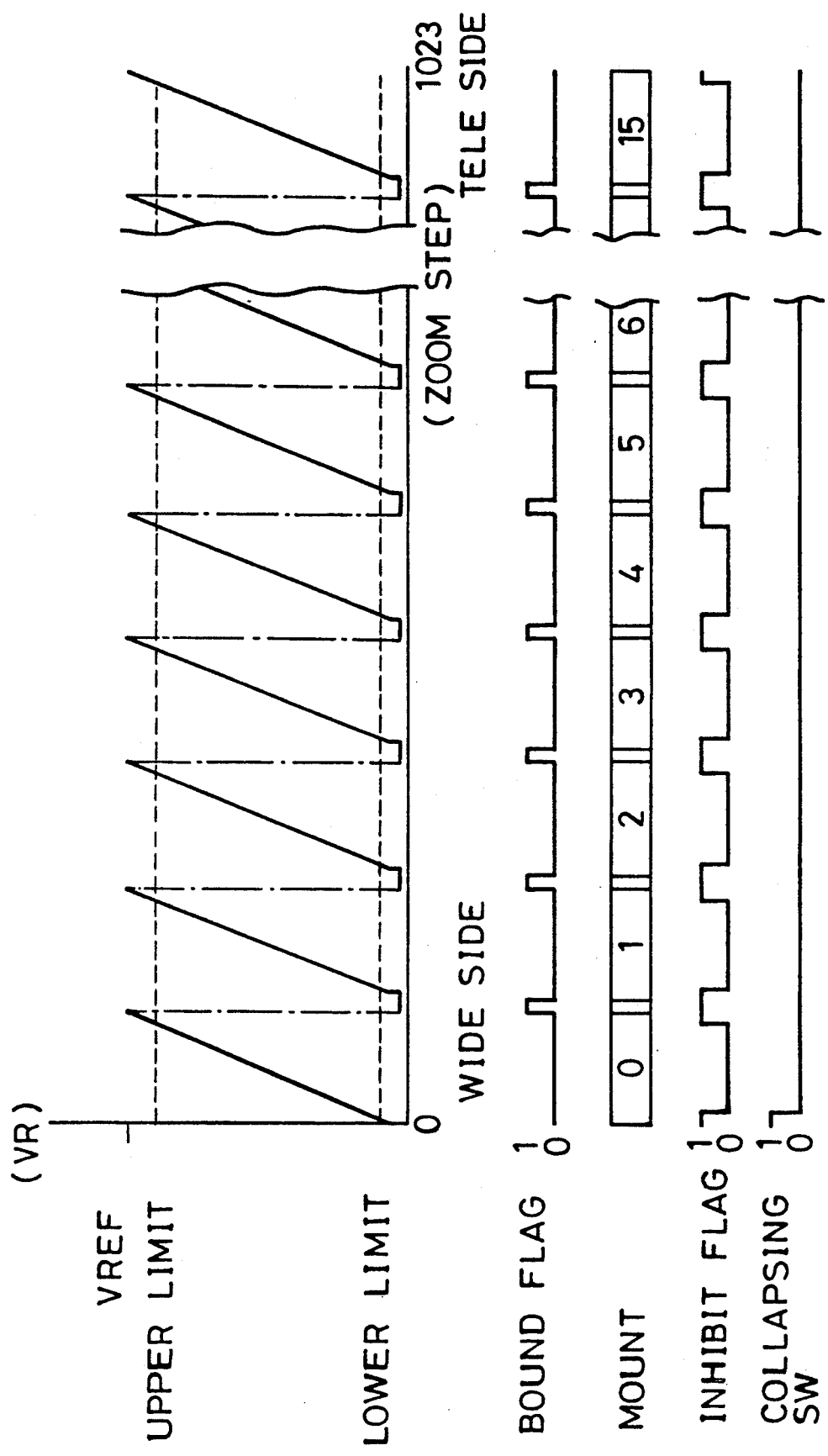
FIG. 15 is an explanatory view illustrating the operation of the circuit of FIG. 14 during zooming of the zoom assembly.
Figure 17:
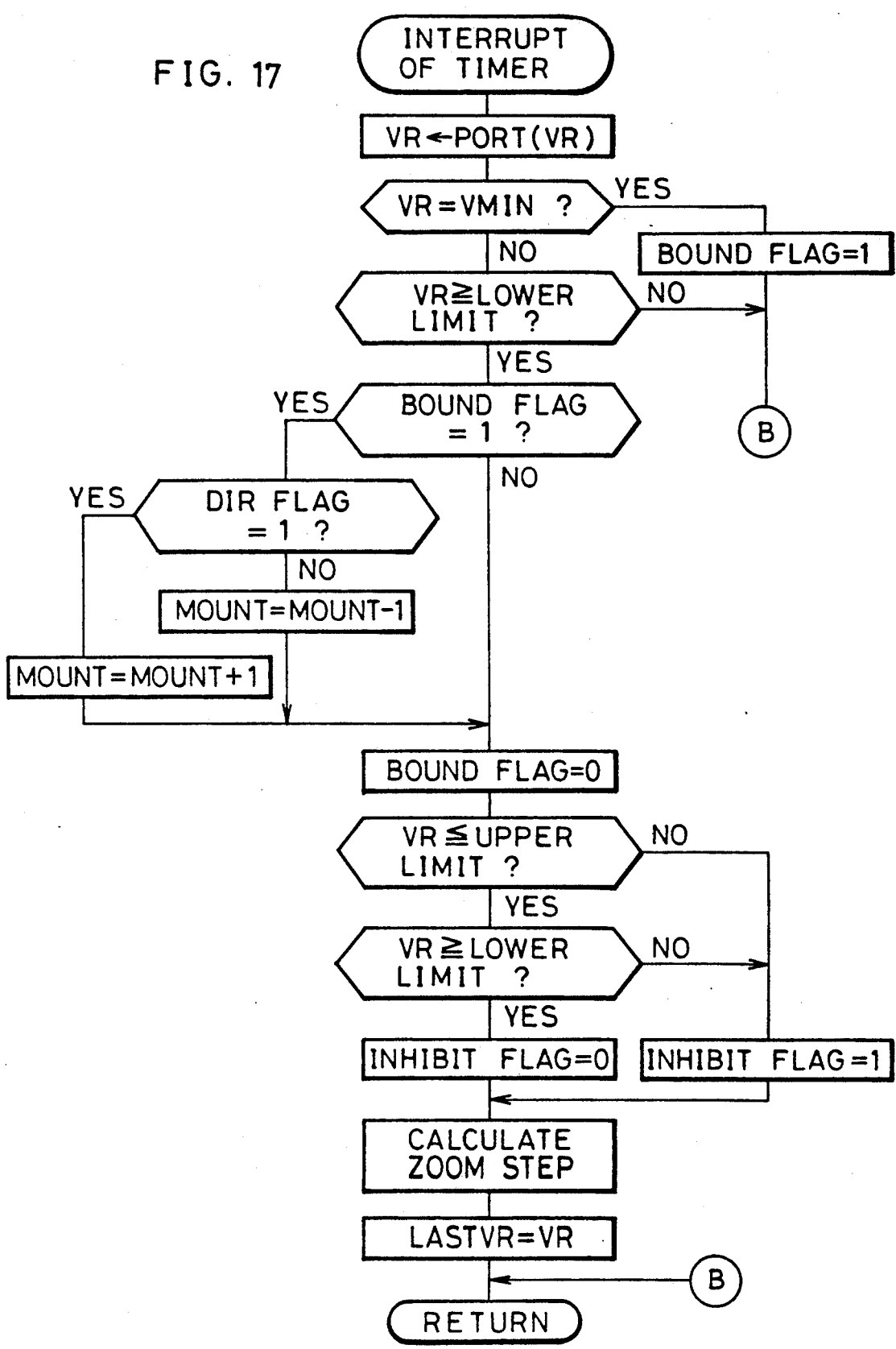
FIG. 17 is a flow chart similar to FIGS. 11 and 12 but for the circuit of FIG. 14.

FIG. 14 illustrates the circuitry for use with the potentiometer 60. The CPU 37 is connected to the main switch 2, collapsing switch 39, wide-angle switch 40, and telephoto switch 41, although these are omitted from FIG. 14 for clarity of illustration. A resistor 63 has a resistance of 20 Rc, and a resistor 64 has a resistance of Rc. Designated by 65 is a transistor. When the brush 62 is slid on the array 61 from the resistor chip 61a toward the resistor chip 61p, the potential VR of the brush 62, at the terminal C, is increased toward VREF when in contact with each of the resistor chips 61a to 61p, as illustrated in FIG. 15. The voltage VR from the brush 62 is converted by the A/D converter 38 into a digital voltage PORT(VR), which is read into the CPU 37 by interruption of the timer in the routine illustrated in FIG. 17. When the brush 62 is not in contact with any of the resistor chips 61a to 61p but rather is disposed between them, a small value of the voltage VR is generated at the terminal C as a division of VREF caused by the resistor 63 of resistance 20 Rc and the resistor 64 of resistance Rc.

The brush 62 in the potentiometer 60 is low in stability in voltage VR in the vicinity of the ends of the resistor chips 61a to 61p as connected to the electrodes 27a to 27p and 28a to 28p, because the brush 62 is in poor contact with the resistor chips 61a to 61p. To cope with this problem, the CPU 37 compares VR with the above UPPER LIMIT and LOWER LIMIT. If the CPU 37 judges that "VR<LOWER LIMIT" or "VR>UPPER LIMIT", then INHIBIT FLAG is 1. When the CPU 37 judges that "LOWER LIMIT≦VR≦UPPER LIMIT"., then INHIBIT FLAG is zero. The zoom motor 20 is controlled according to the setting of INHIBIT FLAG by the CPU 37. When INHIBIT FLAG is zero, then the zoom motor 20 is allowed to stop with brush 62 on any of the resistor chips 61a to 61p, and sufficiently spaced from their ends. When INHIBIT FLAG is 1, the zoom motor 20 is successively rotated even when the zoom button 4 is released. Such subsequent rotation of the zoom motor 20 inhibits the brush 62 from stopping between the resistor chips 61a to 61p or at their ends. When the brush 62 is between the resistor chips 61a to 61p, the divided voltage VR does not reach zero, but can be kept smaller than the voltage of LOWER LIMIT when the latter is set appropriately, e.g. to be 1/20 of VREF. This is because the resistors 63 and 64 divide VREF so as to obtain the divided voltage VR as 1/21 of VREF. Let the 1/21 of VREF be VMIN or the minimum potential of the brush 62 when neither terminal A or B is connected to the terminal C. Note that VMIN is represented in FIG. 15 by the extreme bottoms of the slope of VR.

The CPU 37 evaluates VR, and sets "BOUND FLAT=1" when VR=VMIN, in order to judge disconnection of the brush 62 from the resistor chips 61a to 61p, so as to detect the passage of the brush 62 from one resistor chip to another. The CPU 37 monitors the above DIR FLAG and the change in BOUND FLAG, and judges the position, and direction in movement, of the brush 62. When DIR FLAG is 1, the brush 62 is moving in the direction of increase in MOUNT. When DIR FLAG is zero, the brush 62 is moving in the direction of decrease in MOUNT.

Figure 16:
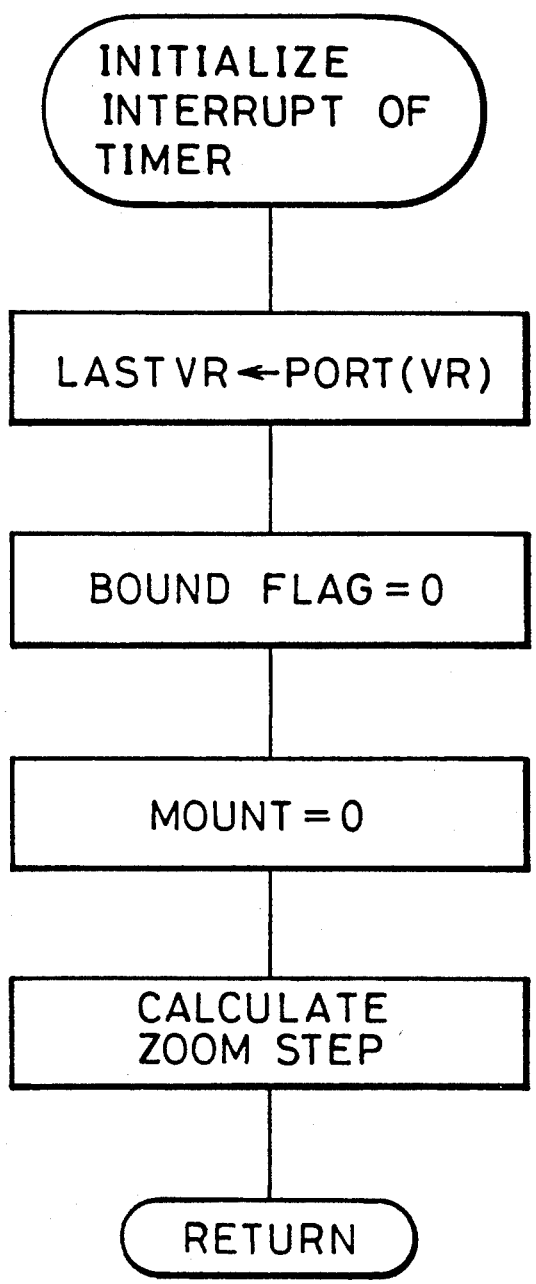
FIG. 16 is a flow chart similar to that of FIG. 10 but for the circuit of FIG. 14.

When the brush 62 moves in the direction of increase in MOUNT, the count in the counter 49 is incremented by one. When the brush 62 moves in the direction of decrease in MOUNT, the counter 49 is decremented by one. To initiate interruption of the timer as illustrated in FIG. 16, the CPU 37 resets the counter 49 to the count of zero. The count of the counter 49 is set in correspondence to MOUNT indicating the contact of one of the resistor chips 61a to 61p with the brush 62.

Upon detection of the voltage VR to be VMIN in the CPU 37, BOUND FLAG is responsively set to be 1, in order that, while the brush 62 is between the resistor chips 61a to 61p, the counter 49 is changed only one time even despite a plurality of times of interruption of the timer. Immediately upon the increasing VR becoming LOWER LIMIT while BOUND FLAG is 1, then the CPU 37 controls the counter 49 according to the value of DIR FLAG.

The area of each of the sixteen resistor chips 61a to 61p is split into 64, which corresponds with the 64 steps in voltage and are designated as ZOOM STEP in the range from zero to 63. The ZOOM STEP for all the array 61, assisted by the count of the counter 49, can designate any zooming datum of the zoom assembly 3 at one of 1024 values from zero to 1023.

In the present embodiment, the CPU 37 turns on the transistor 65 throughout the period of enabling the interruption of the timer. Alternatively, the transistor 65 may be turned on only upon starting each interruption of the timer, so as to check VR=VMIN. The transistor 675, then, may be turned off, while VR of the brush 62 is evaluated. Upon such turning off of the transistor 65, disconnection of the brush 62 from the resistor chips brings the potential VR to be zero, lower than VMIN.

Figure 18:
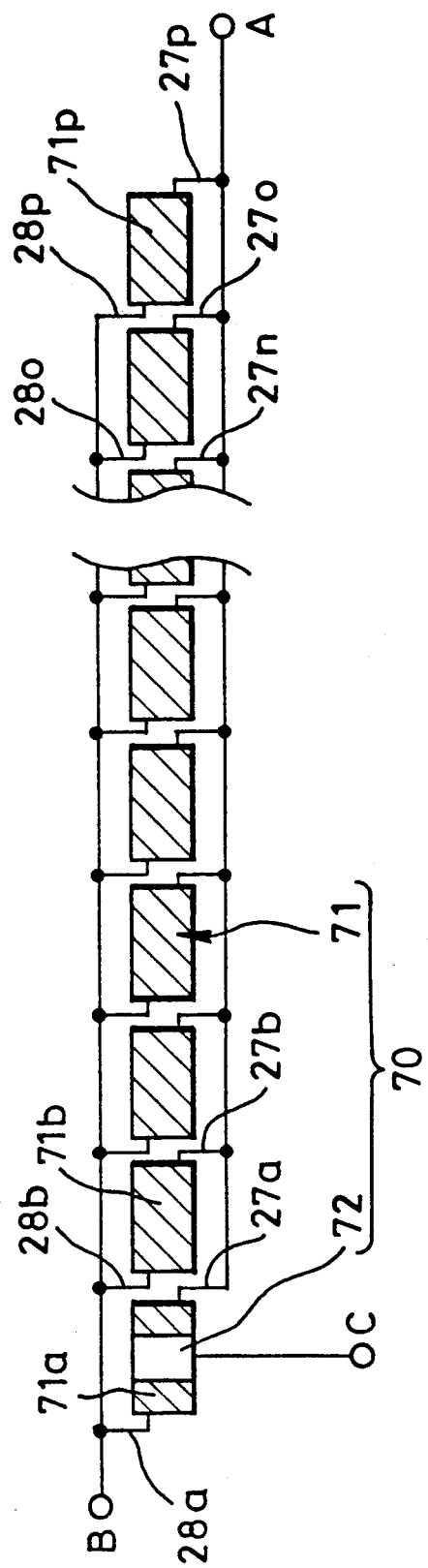
FIG. 18 is a schematic view illustrating still another potentiometer for use in the novel camera.

FIG. 18 illustrates still another potentiometer 70 in use with the novel camera. Elements similar to those of the preceding embodiments are designated with identical reference numerals. The camera is provided with an array 71 of sixteen resistor chips 71a, 71b, 71c, ..., 71o, 71p. Designated by 72 is a brush, constituting the potentiometer 70 with the resistor chips 71a to 71p. The resistor chips 71a to 71p are aligned at a constant interval which is slightly less than the width of the brush 72, unlike those of the preceding potentiometer 60.

Figure 19:
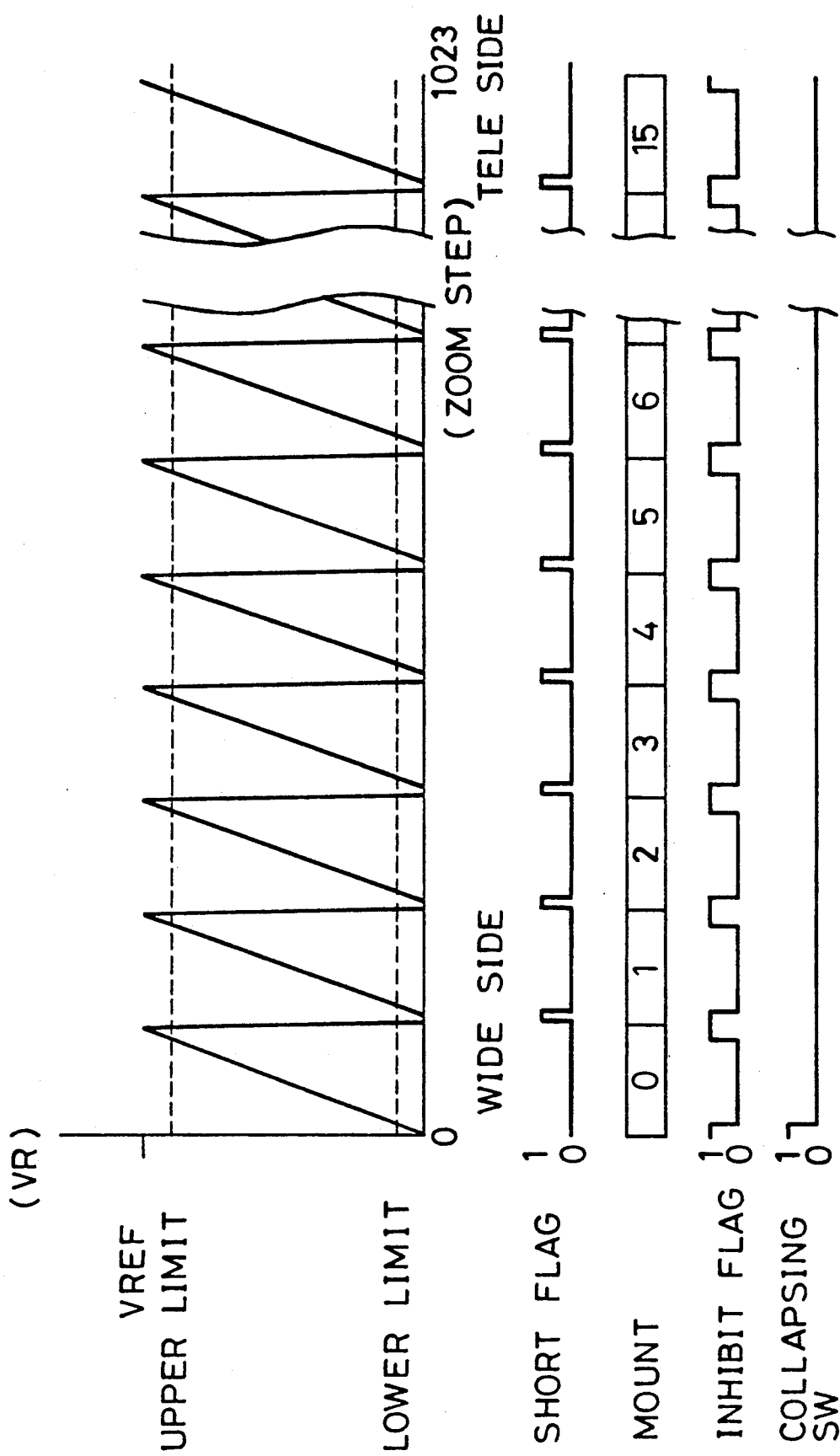
FIG. 19 is a view similar to FIG. 15 but for the potentiometer of FIG. 18.
Figure 20:
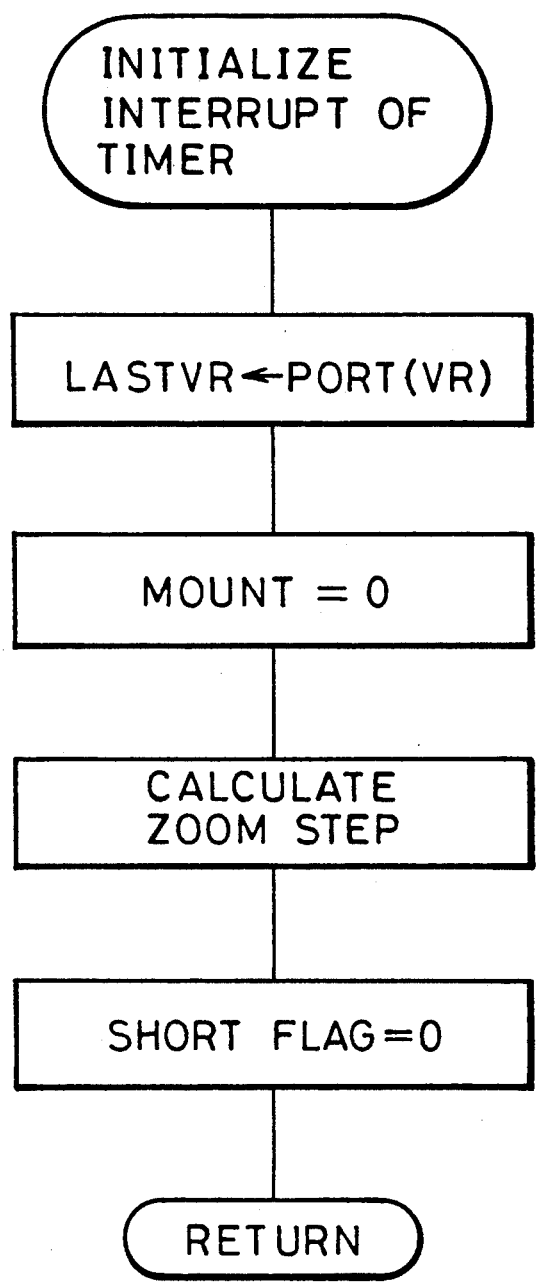
FIG. 20 is a flow chart similar to FIGS. 10 and 16 but for the potentiometer of FIG. 18.

The potentiometer 70 is arranged in the circuitry of FIG. 4. Even when the brush 72 is between the resistor chips 71a to 71p, the brush 72 is in uninterrupted contact with the resistor chips 71a to 71p, which is different from the arrangement of FIG. 13. The output voltage VR from the brush 72 is illustrated in FIG. 19. The CPU 37 evaluates VR, and sets "SHORT FLAG=1" when VR=0, in order to detect a short-circuited state of the brush 72 between any adjacent two of the resistor chips 71a to 71p, so as to detect the passage of the brush 72 from one resistor chip to another. Upon detection of a short-circuited state from the voltage VR, the CPU 37 responsively sets SHORT FLAG to be 1. When interruption of the timer is initiated as shown in FIG. 20, SHORT FLAG is reset to be zero.

The CPU 37 follows the routine of FIG. 21 to control the counter 49 in accordance with the values of DIR FLAG and SHORT FLAG. When DIR FLAG is 1, VR>LASTVR and SHORT FLAG is 1, then the count in the counter 49 is incremented by one. When DIR FLAG is zero, VR<LASTVR and SHORT FLAG is 1, then the count in the counter 49 is decremented by one. Therefore, ZOOM STEP, in accordance with the present embodiment, can also designate 1024 values even when using an A/D converter 38 of 8-bit resolution, because the position of the brush 26a is detected in the preliminary 16 steps before detecting VR in the A/D converter 38.

Although the 8-bit A/D converter 38 is used to output the voltage data as a 6-bit signal for 64 steps, alternatively a 6-bit A/D converter can be used to generate such a 6-bit signal.

Although the zooming amount of the zoom assembly 3 is detected in accordance with the movement of the intermediate barrel 14 in the present embodiments, the zooming amount may instead be detected in accordance with the movement of the innermost barrel 15.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as being included therein.

What is claimed is:

1. A zoom camera incorporating a zoom assembly provided with a zoom lens system, which zoom assembly includes stationary barrel means and movable barrel means, said zoom camera comprising:
   an elongated resistor element arranged in a stationary manner and extending in the direction of movement of said movable barrel means;
   a first electrode group connected to said resistor element and constituted of N electrodes connected in alignment in the lengthwise direction of said elongated resistor element and at a constant interval, to which N electrodes a first potential is adapted to be applied;
   a second electrode group connected to said resistor element and constituted of N−1 or N electrodes connected in alignment in said lengthwise direction of said elongated resistor element, at a constant interval, and in alternation with said electrodes of said first electrode group, to which N−1 or N electrodes a second potential is adapted to be applied, said second potential being different from said first potential;
   resistor areas into which said resistor element is divided with reference to respective said electrodes of said first and second electrode groups;
   a contact segment slidable on said resistor element upon movement of said movable barrel means, said contact segment generating a voltage signal for representing a contact position of said contact segment within respective said resistor areas;
   an A/D converter for converting said voltage signal from said contact segment into voltage data;
   resistor area detecting means for detecting the location of the resistor area with which said contact segment is in contact; and
   means for identifying the position of said movable barrel means in accordance with said voltage data and a signal from said resistor area detecting means.

2. A zoom camera as defined in claim 1, wherein said resistor area detecting means includes a counter for counting the number of times the rate of change of said voltage signal of said contact segment changes between positive and negative while said movable barrel means is moved.

3. A zoom camera as defined in claim 2, wherein:
   said counter is rest to an initial position of said contact segment corresponding to the beginning of movement of said movable barrel means;
   said counter is caused to increment upon passage of said contact segment by one electrode while said contact segment is moved from a wide-angle position toward a telephoto position, said wide-angle position being near said initial position of said contact segment; and
   said counter is caused to decrement upon passage of said contact segment by one electrode while said contact segment is moved from said telephoto position toward said wide-angle position.

4. A zoom camera as defined in claim 1, wherein said resistor element is arranged outside said stationary barrel means.

5. A zoom camera as defined in claim 1, further comprising control means for preventing said contact segment from stopping in any position where said electrodes are connected.

6. A zoom camera as defined in claim 5, wherein:
   said control means compares said voltage signal of said contact segment with a predetermined upper limit value and a predetermined lower limit value while driving said movable barrel means; and,
   when said voltage signal is above said upper limit value or below said lower limit value, said control means judges said contact segment to be in the vicinity of said connected positions of said electrodes and then prevents said movable barrel means from stopping despite the generation of an external command for stopping said movable barrel means.

7. A zoom camera as defined in claim 1, wherein:
   said movable barrel means includes a first movable barrel and a second movable barrel arranged inside said first movable barrel for holding said zoom lens system and moving rectilinearly in the direction of the optical axis of said lens system by rotation of said first movable barrel;
   said first movable barrel has a first external helicoidal thread formed on the outside of said first barrel and a first internal helicoidal thread formed on the inside of said first barrel, said first external helicoidal thread being engaged with a second internal helicoidal thread formed inside said stationary barrel means; and
   said second movable barrel has a second external helicoidal thread formed on the outside of said second barrel, said second external helicoidal thread being engaged with said first internal helicoidal thread.

8. A zoom camera as defined in claim 7, further comprising a mechanism for rotating said first movable barrel, said mechanism including a zoom motor, a first gear formed on the outside of said first movable barrel, and a second gear in mesh with said first gear, said second gear being rotatable by said zoom motor.

9. A zoom camera as defined in claim 8, wherein said mechanism for rotating said first movable barrel further includes:
   a splined shaft parallel to said optical axis and rotatable by said zoom motor, said splined shaft being in mesh with said second gear;
   a feed screw parallel to said optical axis and rotatable by said zoom motor; and
   a bush mounted around said feed screw, said bush being movable with said first gear, said bush supporting said contact segment, said second gear being mounted rotatably around said bush, and said second gear causing said first gear to rotate when said feed screw and said splined shaft rotate.

10. A zoom camera as defined in claim 7, wherein said second movable barrel contains first and second lens holders, said first lens holder supports a front lens group of said zoom lens system, and said second lens holder supports a rear lens group of said zoom lens system.

11. A zoom camera as defined in claim 10, further comprising a focussing mechanism for moving said second lens holder in said optical axis direction.

12. A zoom camera incorporating a zoom assembly provided with a zoom lens system, which zoom assembly includes stationary barrel means and movable barrel means, said zoom camera comprising:
   a stationary resistor chip array constituted of N resistor chips arranged in alignment in the direction of movement of said movable barrel means and spaced at a constant interval, said resistor chips having substantially equal length;
   a first electrode group connected to respective said resistor chips and constituted of N electrodes connected to respective first ends of said resistor chips with reference to said direction of movement, to which N electrodes a first potential is applied;
   a second electrode group connected to respective said resistor chips and constituted of N electrodes connected to respective second ends opposite to said first ends of said resistor chips, to which N electrodes a second potential is applied, said second potential being different from said first potential;
   a contact segment sliding on said resistor chip array upon movement of said movable barrel means, said contact segment generating a voltage signal representing a contact position on respective said resistor chips;
   an A/D converter for converting said voltage signal from said contact segment into voltage data;
   chip detecting means for detecting the location of a said resistor chip with which said contact segment is in contact; and
   means for identifying the position of said movable barrel means in accordance with said voltage data and a signal from said chip detecting means.

13. A zoom camera as defined in claim 12, wherein said interval between said resistor chips is greater than the width of said contact segment.

14. A zoom camera as defined in claim 13, wherein said chip detecting means includes a counter for counting the number of times said voltage signal of said contact segment falls to a predetermined minimum value while said movable barrel means is moved.

15. A zoom camera as defined in claim 14, further comprising:
   means resetting said counter in an initial position of said contact segment corresponding to the beginning of movement of said movable barrel means;
   means causing said counter to increment upon passage of said contact segment over one space between said resistor chips, while said contact segment is moved from a wide-angle position toward a telephoto position, said wide-angle position being near to said initial position of said contact segment; and
   means causing said counter to decrement upon passage of said contact segment over one space between said resistor chips, while said contact segment is moved from said telephoto position toward said wide-angle position.

16. A zoom camera as defined in claim 12, wherein the width of said contact segment is greater than said interval between said resistor chips.

17. A zoom camera as defined in claim 16, wherein said chip detecting means includes a counter for counting the number of times said first and second electrode groups are short-circuited by said contact segment while said movable barrel means is moved.

18. A zoom camera as defined in claim 17, further comprising:
   means resetting said counter in an initial position of said contact segment corresponding to the beginning of movement of said movable barrel means;
   means causing said counter to increment upon passage of said contact segment over one space between said resistor chips, while said contact segment is moved from a wide-angle position toward telephoto position, said wide-angle position being near to said initial position of said contact segment; and
   means causing said counter to decrement upon passage of said contact segment over one space between said resistor chips, while said contact segment is moved from said telephoto position toward said wide-angle position.

19. A zoom camera as defined in claim 12, wherein said resistor chip array is arranged outside said stationary barrel means.

20. A zoom camera as defined in claim 12, further comprising control means for preventing said contact segment from stopping in the vicinity of positions where said electrodes are connected.

21. A zoom camera as defined in claim 20, wherein:
   said control means compares said voltage signal of said contact segment with a predetermined upper limit value and a predetermined lower limit value while driving said movable barrel means; and
   when said voltage signal is over said upper limit value or below said lower limit value, said control means judges said contact segment to be in the vicinity of a said connected position of said electrodes and prevents said movable barrel means from stopping despite the generation of an external command for stopping said movable barrel means.

22. A zoom camera as defined in claim 12, wherein:
   said movable barrel means includes a first movable barrel and a second movable barrel arranged inside said first movable barrel for holding said zoom lens system and moving rectilinearly in the direction of the optical axis of said lens system by rotation of said first movable barrel;
   said first movable barrel has a first external helicoidal thread formed on the outside of said first barrel and a first internal helicoidal thread formed on the inside of said first barrel, said first external helicoidal thread being engaged with a second internal helicoidal thread formed inside said stationary barrel means; and
   said second movable barrel has a second external helicoidal thread formed on the outside of said second barrel, said second external helicoidal thread being engaged with said first internal helicoidal thread.

23. A zoom camera as defined in claim 22, further comprising a mechanism for rotating said first movable barrel, said mechanism including a zoom motor, a first gear formed on the outside of said first movable barrel, and a second gear in mesh with said first gear, said second gear being rotatable by said zoom motor.

24. A zoom camera as defined in claim 23, wherein said mechanism for rotating said first movable barrel further includes:

a splined shaft parallel to said optical axis and rotatable by said zoom motor, said splined shaft being in mesh with said second gear;

a feed screw parallel to said optical axis and rotatable by said zoom motor; and a bush mounted around said feed screw, said bush being movable with said first gear, said bush supporting said contact segment, said second gear being mounted rotatably around said bush, and said second gear causing said first gear to rotate when said feed screw and said splined shaft rotate.

25. A zoom camera as defined in claim 22, wherein said second movable barrel contains first and second lens holders, said first lens holder supports a front lens group of said zoom lens system, and said second lens holder supports a rear lens group of said zoom lens system.

26. A zoom camera as defined in claim 25, further comprising a focussing mechanism for moving said second lens holder in said optical axis direction.

27. A method of operating a zoom camera incorporating a zoom assembly provided with a zoom lens system, which zoom assembly includes stationary barrel means and axially movable barrel means; the method comprising the steps of:

arranging an elongated resistor element in a stationary manner so as to extend in the direction of axial movement of said movable barrel means;

connecting a plurality of electrodes to said resistor element, said electrodes being arranged in alignment in said axial direction and at a constant interval;

dividing said resistor element into a plurality of resistor areas individual to respective said electrodes;

applying a first potential to odd-numbered electrodes of said aligned electrodes;

applying a second potential to even-numbered electrodes of said aligned electrodes, said second potential being different from said first potential;

sliding a contact segment along said resistor element upon movement of said movable barrel means, said contact segment generating a voltage signal representing a contact position on respective said resistor areas;

converting said voltage signal from said contact segment into digital voltage data;

detecting the location of the resistor area with which said contact segment is in contact; and identifying the position of said movable barrel means in accordance with said voltage data and said contact location of said resistor area with said contact segment.

28. A method of operating a zoom camera incorporating a zoom assembly provided with a zoom lens system, which zoom assembly includes stationary barrel means and axially movable barrel means; the method comprising the steps of:

arranging a resistor chip array in a stationary manner, said array comprising N resistor chips having substantially equal lengths, said chips being spaced at constant intervals and arranged in alignment in the direction of axial movement of said movable barrel means;

connecting a first electrode group to respective said resistor chips, said first group being constituted of N electrodes connected to respective first ends of said resistor chips with reference to said direction of movement;

connecting a second electrode group to respective said resistor chips, said second group being constituted of N electrodes connected to respective second ends opposite to said first ends of said resistor chips;

applying a first potential to said first electrode group;

applying a second potential to said second electrode group, said second potential being different from said first potential;

sliding a contact segment on said resistor chip array upon movement of said movable barrel means, said contact segment generating a voltage signal representing the contact position on respective said resistor chips;

converting said voltage signal from said contact segment into digital voltage data;

detecting the resistor chip with which said contact segment is in contact; and identifying the position of said movable barrel means in accordance with said voltage data and said detected resistor chip in contact with said contact segment.

29. A method as defined in claim 28, and making said interval between said resistor chips greater than the width of said contact segment.

30. A method as defined in claim 28, and making the width of said contact segment greater than said interval between said resistor chips.

* * * * *